US011522941B2

(12) United States Patent
Tokunaga

(10) Patent No.: US 11,522,941 B2
(45) Date of Patent: Dec. 6, 2022

(54) COMMUNICATION APPARATUS CAPABLE OF COMMUNICATING WITH EXTERNAL APPARATUS BASED ON HYPERTEXT TRANSFER PROTOCOL, METHOD FOR CONTROLLING COMMUNICATION APPARATUS, AND RECORDING MEDIUM

(71) Applicant: CANON KABUSHIKI KAISHA, Tokyo (JP)

(72) Inventor: Koshi Tokunaga, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/694,863

(22) Filed: Nov. 25, 2019

(65) Prior Publication Data

US 2020/0186586 A1 Jun. 11, 2020

(30) Foreign Application Priority Data

Dec. 7, 2018 (JP) ............................ JP2018-229968

(51) Int. Cl.
*H04L 67/02* (2022.01)
*G06F 9/54* (2006.01)
(Continued)

(52) U.S. Cl.
CPC .............. *H04L 67/02* (2013.01); *G06F 9/547* (2013.01); *H04L 67/60* (2022.05); *H04N 5/213* (2013.01); *H04N 5/23296* (2013.01)

(58) Field of Classification Search
CPC ......... H04L 67/02; H04L 67/32; H04L 67/42; G06F 9/547; G06F 16/51; G06F 16/955;
(Continued)

(56) References Cited

U.S. PATENT DOCUMENTS

2014/0047368 A1 2/2014 Yang
2015/0007199 A1 * 1/2015 Valeva .................. G06F 9/546 719/313

(Continued)

FOREIGN PATENT DOCUMENTS

CN 106796553 A 5/2017
CN 107295007 A 10/2017

(Continued)

*Primary Examiner* — John A Follansbee
*Assistant Examiner* — Kamal M Hossain
(74) *Attorney, Agent, or Firm* — Canon U.S.A., Inc. IP Division

(57) ABSTRACT

A communication apparatus includes a communication unit configured to communicate with an external apparatus based on Hypertext Transfer Protocol (HTTP), a recording medium configured to record programs corresponding to a plurality of application programming interfaces (APIs), and a control unit configured to control the communication unit to, when a request regarding any of the plurality of APIs is received, execute the program corresponding to the API regarding which the request is received, and return a response including a data set described in a predetermined structure to the request, wherein the control unit is configured to perform control to describe the data set in the same structure in a case where a request using a first HTTP request method regarding a predetermined API among the plurality of APIs is received and in a case where a request using a second HTTP request method regarding the predetermined API is received.

16 Claims, 21 Drawing Sheets

700

| API Name (URL) | Method | Description | Example of Request (JSON) | Example of Response (JSON) |
|---|---|---|---|---|
| 701 ./functions/datetime | GET | Acquire Date and Time<br>datetime: Day of Week, Date, Time, and Time Difference<br>dst: Daylight Saving Time | — | { "datetime":"Sun, 1 Apr 2018 9:30:00 +0900", "dst":false } |
| | PUT | Change Date and Time<br>datetime: Day of Week, Date, Time, and Time Difference<br>dst: Daylight Saving Time | { "datetime":"Mon, 2 Apr 2018 14:30:00 +0900", "dst":false } | { "datetime":"Mon, 2 Apr 2018 14:30:00 +0900", "dst":false } |
| 702 ./functions/copyright | GET | Acquire Copyright Holder Name<br>copyright: Copyright Holder Name | — | { "copyrignt":"Hogeta Hogezou" } |
| | PUT | Change Copyright Holder Name<br>copyright: Copyright Holder Name | { "copyrignt":"Hogesaki Hogetarou" } | { "copyrignt":"Hogesaki Hogetarou" } |
| | DELETE | Delete Copyright Holder Name (Change to Initial Value)<br>copyright: Copyright Holder Name | — | { "copyrignt":"" } |
| ⋮ | | | | |

(51) Int. Cl.

| | |
|---|---|
| ***H04L 67/60*** | (2022.01) |
| *H04N 5/213* | (2006.01) |
| *H04N 5/232* | (2006.01) |
| *H04N 21/431* | (2011.01) |
| *H04N 21/443* | (2011.01) |
| *H04N 21/81* | (2011.01) |
| *H04N 21/4223* | (2011.01) |
| *G06F 16/51* | (2019.01) |
| *G06F 16/955* | (2019.01) |
| *H04L 67/01* | (2022.01) |

(58) Field of Classification Search

CPC ............... H04N 5/213; H04N 5/23296; H04N 21/4223; H04N 21/4431; H04N 21/8173; H04N 21/431; H04N 5/23206; H04N 5/23203; H04N 5/23225

See application file for complete search history.

(56) References Cited

U.S. PATENT DOCUMENTS

2015/0222517 A1* 8/2015 McLaughlin ........... H04L 67/55 713/171
2017/0295311 A1 10/2017 Tokunaga
2018/0020495 A1* 1/2018 Nakayama ............ H04W 12/08
2018/0322168 A1 11/2018 Levine

FOREIGN PATENT DOCUMENTS

JP 2013-073506 A 4/2013
JP 2017-511028 A 4/2017
KR 20170129748 A 11/2017

* cited by examiner

FIG.4

Definitions of Methods

| | Method | Meaning |
|---|---|---|
| 401 | GET | Content (Image File), Camera Information and Camera State, and Capability Value or Setting Value of Setting Item |
| 402 | POST | Save Object in Camera or Execute Function of Camera |
| 403 | PUT | Change Setting Value |
| 404 | DELETE | Delete Content or Initialize Setting Value |

API Categorization

407

| | Category of API | Description |
|---|---|---|
| 408 | ./deviceinformation | Acquire Fixed Information about Digital Camera |
| 409 | ./devicestatus | Acquire State Information about Digital Camera |
| 410 | ./functions | Acquire or Change Menu Setting<br>Execute Menu Function |
| 411 | ./shooting/control | Execute Image Capturing Function |
| 412 | ./shooting/settings | Acquire or Change Imaging Parameter Setting |
| 413 | ./shooting/liveview | Acquire Through Image (Live View Image) |
| 414 | ./event | Acquire Event Information Issued by Digital Camera |
| 415 | ./contents | Acquire Content Saved in Medium Attached to Digital Camera |

Top URL http://[IP Address]:[Port Number]/api/ver1 405

| | API Name (URL) | Method | Description | Response Body (JSON) |
|---|---|---|---|---|
| 406 | http://192.168.1.1:8080/api/ver1 | GET | Acquire List of Compatible APIs | {<br>"ver1":[<br>{"url":"http://192.168.1.1:8080/api/ver1/deviceinfomation",<br>"get": true,<br>"post": false,<br>"put": false,<br>"delete": false},<br>{"url":"http://192.168.1.1:8080/api/ver1/devicestatus/storage",<br>"get": true,<br>"post": false,<br>"put": false,<br>"delete": false},<br>...<br>...<br>] |

| | API Name (URL) | Method | Description | Request Body (JSON) | Response Body (JSON) |
|---|---|---|---|---|---|
| 501 | /deviceinformation | GET | Acquire Product Information<br><br>productname: Product Name<br>manufacturer: Manufacturer Name<br>firmwareversion: Firmware Version<br>serialnumber: Serial Number | — | {<br>"productname":"EOS",<br>"munufacturer":"Canon Inc",<br>"firmwareversion":"1.0.0"<br>"serialnumber":111122223333,<br>} |
| 502 | /devicestatus/storage | GET | Acquire Storage Information<br><br>storageid: Storage Area ID<br>type: Type of Storage<br>accesscapability: Access Capability<br>maxsize: Maximum Storage Capacity<br>spacesize: Free Space<br>imagenumber: Number of Saved Contents | — | {<br>"storage":[<br>{<br>"storageid":1,<br>"type":"Storage",<br>"accesscapability":"Read/Write",<br>"maxsize":15924199424,<br>"spacesize":9595781120,<br>"imagenumber":100,<br>},<br>{<br>"storageid":2,<br>"type":"SD",<br>"accesscapability":"Read Only",<br>"maxsize":8111783936,<br>"spacesize":634539246,<br>"imagenumber":69,<br>}]<br>} |
| 503 | /devicestatus/battery | GET | Acquire Battery Information<br><br>kind: Type<br>name: Battery Name<br>level: Remaining Amount<br>quality: Degree of Deterioration | — | {<br>"kind":"battery",<br>"name":"LP-E6N",<br>"level":"full",<br>"quality":"good"<br>} |
| | | | ⋮ | | |

| API Name (URL) | Method | Description | Example of Request (JSON) | Example of Response (JSON) |
|---|---|---|---|---|
| 701 ./functions/datetime | GET | Acquire Date and Time<br><br>datetime: Day of Week, Date, Time, and Time Difference<br>dst: Daylight Saving Time | — | {<br>"datetime":"Sun, 1 Apr 2018 9:30:00 +0900",<br>"dst":false<br>} |
| | PUT | Change Date and Time<br><br>datetime: Day of Week, Date, Time, and Time Difference<br>dst: Daylight Saving Time | {<br>"datetime":"Mon, 2 Apr 2018 14:30:00 +0900",<br>"dst":false<br>} | {<br>"datetime":"Mon, 2 Apr 2018 14:30:00 +0900",<br>"dst":false<br>} |
| 702 ./functions/copyright | GET | Acquire Copyright Holder Name<br><br>copyright: Copyright Holder Name | — | {<br>"copyrignt":"Hogeta Hogezou"<br>} |
| | PUT | Change Copyright Holder Name<br><br>copyright: Copyright Holder Name | {<br>"copyrignt":"Hogesaki Hogetarou"<br>} | {<br>"copyrignt":"Hogesaki Hogetarou"<br>} |
| | DELETE | Delete Copyright Holder Name (Change to Initial Value)<br><br>copyright: Copyright Holder Name | — | {<br>"copyrignt":""<br>} |
| ⋮ | | | | |

| | API Name (URL) | Method | Description | Example of Request (JSON) | Example of Response (JSON) |
|---|---|---|---|---|---|
| 901 | ./shooting/control/shutterbutton | POST | Capture Single Image by Pressing Shutter (Still Image Capturing) Button<br>af: Enable/Disable AF | { "af":true } | { } |
| 902 | ./shooting/control/recbutton | POST | Press Image Recording (Moving Image Capturing) Button<br>action: Start/Stop Recording of Image | { "action":"start" } | { } |
| | ⋮ | | | | |

| | API Name (URL) | Method | Description | Example of Request (JSON) | Example of Response (JSON) |
|---|---|---|---|---|---|
| 1101 | ./shooting/settings/exposure | GET | Acquire Current Value and Settable Values of Exposure Compensation<br><br>value: Current Value<br>ability: Settable Values | – | {<br>"value":"0.0",<br>"ability":["-2.0","-1 2/3","-1 1/3","-1.0",<br>"-0 2/3","-0 1/3","0.0",<br>"+0 1/3","+0 2/3","+1.0",<br>"+1 1/3","+1 2/3","2.0"]<br>} |
| | | PUT | Change Value of Exposure Compensation<br>value: Changed Value | {<br>"value":"+2.0"<br>} | {<br>"value":"+2.0"<br>} |
| 1102 | ./shooting/settings/iso | GET | Acquire Current Value and Settable Values of ISO Sensitivity<br><br>value: Current Value<br>ability: Settable Values | – | {<br>"value":"100",<br>"ability":["auto","100","125","160",<br>"200","250","320","400","500",<br>"640","800","1000","1250",<br>"1600","2000","2500","3200"]<br>} |
| | | PUT | Change Value of ISO Sensitivity<br>value: Changed Value | {<br>"value":"1600"<br>} | {<br>"value":"1600"<br>} |
| 1103 | ./shooting/settings/wb | GET | Acquire Current Value and Settable Values of White Balance<br><br>value: Current Value<br>ability: Settable Values | – | {<br>"value":"awb",<br>"ability":["awb","daylight","shade",<br>"cloudy","tungsten",<br>"fluorescent","flash","custom"]<br>} |
| | | PUT | Change Value of White Balance<br>value: Changed Value | {<br>"value":"daylight"<br>} | {<br>"value":"daylight"<br>} |
| 1104 | ./shooting/settings | GET | Acquire Current Value and Settable Values of All Imaging Parameters<br><br>value: Current Value<br>ability: Settable Values | – | {<br>exposure{<br>"value":"0.0",<br>"ability":["-2.0","-1 2/3","-1 1/3","-1.0",<br>"-0 2/3","-0 1/3","0.0",<br>"+0 1/3","+0 2/3","+1.0",<br>"+1 1/3","+1 2/3","2.0"]},<br>iso{<br>"value":"100",<br>"ability":["auto","100","125","160",<br>"200","250","320","400","500",<br>"640","800","1000","1250",<br>"1600","2000","2500","3200"]},<br>wb{<br>"value":"awb",<br>"ability":["awb","daylight","shade",<br>"cloudy","tungsten",<br>"fluorescent","flash","custom"]},<br>...<br>...<br>} |
| | ⋮ | | | | |

| | API Name (URL) | Method | Description | Example of Request (JSON) | Example of Response (JSON) |
|---|---|---|---|---|---|
| 1301 | ./shooting/liveview | POST | Set Size of Through Image (Remote Live View Image) and Give Instruction to Start and Stop Generation of Through Image<br><br>liveviewsize: Size of Through Image<br>cameradisplay: Instruction to Display on Camera LCD | {<br>"liveviewsize":"small",<br>"cameradisplay":"on"<br>} | { } |
| 1302 | ./shooting/liveview/flip | GET | Acquire Through Image (Remote Live View Image) | — | Through Image Data (One Frame) |
| 1303 | ./shooting/liveview/scroll | GET | Start Acquisition of Through Image (Remote Live View Image) | — | Through Image Data (Chunked Data)<br>53432<br>Through Image Data<br>56753<br>Through Image Data<br>49675<br>Through Image Data<br>...<br>...<br>... |
| | | DELETE | Stop Acquisition of Through Image (Remote Live View Image) | — | Instruction to Stop Chunked Data<br>53432<br>Through Image Data<br>56753<br>Through Image Data<br>49675<br>Through Image Data<br>...<br>...<br>...<br>0 |
| | ⋮ | | | | |

FIG.15

| | API Name (URL) | Method | Description | Example of Request (JSON) | Example of Response (JSON) |
|---|---|---|---|---|---|
| 1501 | ./event/polling? | GET | Acquire Event Information<br><br>[Method for Specifying Query]<br>continue: Whether to Continue Session<br><br>?continue=off: Not Continue<br>             * Default<br>?continue=on: Continue | — | {<br> battery{<br>  "name":"LP-E6N",<br>  "kind":"battery",<br>  "level":"half",<br>  "quality":"good"<br> }<br>} |
| 1502 | ./event/monitoring | GET | Start Acquisition of Event Information | — | Acquisition of Event Information (Chunked Data)<br><br>2<br>{}<br>2<br>{}<br>…<br>…<br>{<br> battery{<br>  "name":"LP-E6N",<br>  "kind":"battery",<br>  "level":"half",<br>  "quality":"good"<br> }<br>}<br>2<br>{}<br>2<br>{}<br>…<br>… |
| | | DELETE | Stop Acquisition of Event Information | — | Instruction to Stop Chunked Data<br><br>…<br>…<br>2<br>{}<br>2<br>{}<br>0 |
| | | | ⋮ | | |

| | API Name (URL) | Method | Description | Example of Request (JSON) | Example of Response (JSON) |
|---|---|---|---|---|---|
| 1701 | /contents | GET | Acquire URL of Storage Area | — | {<br>"url":[<br>"http://[IPAddress]:[PortNum]/api/ver1/contents/sd",<br>"http://[IPAddress]:[PortNum]/api/ver1/contents/cf",<br>]<br>} |
| 1702 | /contents/sd | GET | Acquire URL of Directory | — | {<br>"url":[<br>"http://192.168.1.1:8080/api/ver1/contents/sd/100CANON",<br>"http://192.168.1.1:8080/api/ver1/contents/sd/101CANON",<br>"http://192.168.1.1:8080/api/ver1/contents/sd/102CANON",<br>...<br>...<br>]<br>} |
| 1703 | /contents/sd/[Directory]? | GET | Acquire URL of Image in Directory<br><br>[Method for Specifying Query]<br>type: Specify File Format<br><br>?type=all: * Default<br>?type=jpeg<br>?type=mp4<br>?type=craw | — | {<br>"url":[<br>"http://192.168.1.1:8080/api/ver1/contents/sd/100CANON/IMG_0001.JPG",<br>"http://192.168.1.1:8080/api/ver1/contents/sd/100CANON/IMG_0002.JPG",<br>"http://192.168.1.1:8080/api/ver1/contents/sd/100CANON/IMG_0003.JPG",<br>"http://192.168.1.1:8080/api/ver1/contents/sd/100CANON/IMG_0004.JPG",<br>"http://192.168.1.1:8080/api/ver1/contents/sd/100CANON/IMG_0005.JPG",<br>...<br>...<br>]<br>} |
| | | DELETE | Delete Directory and Content File in Directory | — | { } |
| 1704 | /contents/sd/[Directory]/[File]? | GET | Acquire File<br><br>[Method for Specifying Query]<br>kind: Specify Type of Content<br><br>?kind=main: Main File * Default<br>?kind=thumbnail: Thumbnail File<br>?kind=embedded: Embedded File<br>?kind=info: Image Information | — | Content File |
| | | PUT | Operate File<br><br>Action: Type of Operation (Protection, Rotation)<br>Value: Setting Value | {<br>action:"protect"<br>value:"enable"<br>} | { } |
| | | DELETE | Delete File | — | { } |
| | ⋮ | | | | |

COMMUNICATION APPARATUS CAPABLE OF COMMUNICATING WITH EXTERNAL APPARATUS BASED ON HYPERTEXT TRANSFER PROTOCOL, METHOD FOR CONTROLLING COMMUNICATION APPARATUS, AND RECORDING MEDIUM

BACKGROUND OF THE INVENTION

Field of the Invention

The present invention relates to a communication apparatus capable of communicating with an external apparatus.

Description of the Related Art

In recent years, with advancement of a communication function of a communication apparatus such as a digital camera or a mobile phone, communication apparatuses have become capable of transmitting and receiving a content to and from each other.

Japanese Patent Application Laid-Open No. 2013-073506 discusses a technique for achieving remote image capturing using a server-client system as in Hypertext Transfer Protocol (HTTP) in which a camera serves as a server. In a case where a remote control function using the HTTP server-client system is provided to a user, a camera, which is remotely controlled, serves as the server, and an apparatus, which remotely controls the camera, serves as the client. Then, a program for controlling the camera is implemented in the apparatus serving as the client, thereby achieving remote control. In this case, a load of implementing the program in the client can be reduced by publishing a combination of a Uniform Resource Locator (URL) for controlling the camera and an executable HTTP method as an application programming interface (API). In the client, which is a counterpart device, a program for achieving remote control is implemented based on the specifications of the published APL However, the specifications of the API, such as the published URL and HTTP method and handling of a request body and a response body, are often developed to include unique specifications, and therefore are hard to understand unless checking the API specification document in many cases. In particular, in a case where a structure of a request body and that of a response body are different with respect to each published URL or each published method, a load of understanding the structure of each published URL or each published method is large. Thus, even if the load is reduced by publishing the API, the load of implementation will still remain.

SUMMARY OF THE INVENTION

According to an aspect of the present invention, a communication apparatus includes a communication unit configured to communicate with an external apparatus based on Hypertext Transfer Protocol (HTTP), a recording medium configured to record programs corresponding to a plurality of application programming interfaces (APIs), and a control unit configured to control the communication unit to, in a case where a request regarding any of the plurality of APIs is received via the communication unit, execute the program corresponding to the API regarding which the request is received, and return a response including a data set described in a predetermined structure to the request, wherein the control unit is configured to perform control to describe the data set in the same structure in a case where a request using a first HTTP request method regarding a predetermined API among the plurality of APIs is received and in a case where a request using a second HTTP request method regarding the predetermined API is received.

Further features of the present invention will become apparent from the following description of embodiments with reference to the attached drawings.

BRIEF DESCRIPTION OF THE DRAWINGS

FIG. 4 is a table illustrating basic configurations of communication application programming interfaces (APIs) according to the embodiment.

FIG. 5 is a table illustrating an API for acquiring fixed information or state information regarding the digital camera according to the embodiment.

FIG. 7 is a table illustrating an API for acquiring or changing a menu setting of the digital camera according to the embodiment.

FIG. 9 is a table illustrating an API for executing an image capturing function of the digital camera according to the embodiment.

FIG. 11 is a table illustrating an API for acquiring or changing an imaging parameter of the digital camera according to the embodiment.

FIG. 13 is a table illustrating an API for acquiring a through image of the digital camera according to the embodiment.

FIG. 15 is a table illustrating an API for acquiring event information regarding the digital camera according to the embodiment.

FIG. 17 is a table illustrating an API for acquiring a content file of the digital camera according to the embodiment.

DESCRIPTION OF THE EMBODIMENTS

Embodiments of the present invention will be described in detail below with reference to the attached drawings. The embodiments described below are examples of means for achieving the present invention, and may be appropriately modified or changed depending on the configuration of an apparatus to which the present invention is applied and various conditions. The embodiments can also be appropriately combined together.

<Configuration of Digital Camera 100>

Figure 1A:
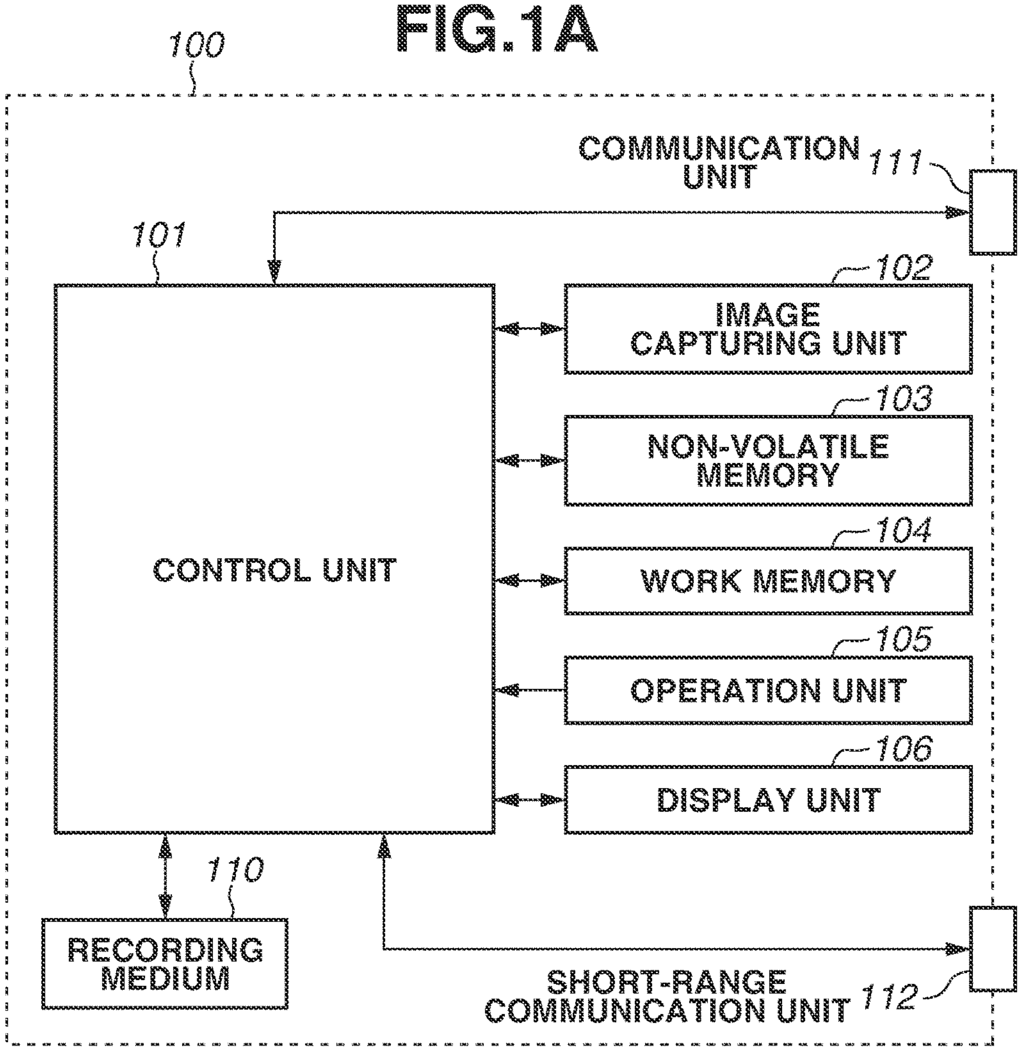
FIGS. 1A, 1B, and 1C are diagrams illustrating a block configuration, a front face, and a back face of a digital camera according to an embodiment.

FIG. 1A is a block diagram illustrating an example of the configuration of a digital camera 100, which is an example of a communication apparatus according to a first embodiment. Although the digital camera is described as the example of the communication apparatus herein, the communication apparatus is not limited to this. For example, the communication apparatus may be a portable media player or an information processing apparatus such as a tablet device or a personal computer.

A control unit 101 controls each component of the digital camera 100 based on an input signal and a program described below. Instead of the control unit 101 controlling the entire apparatus, a plurality of hardware components can share processing to control the entire apparatus.

An image capturing unit 102 includes, for example, an optical lens unit, an optical system for controlling aperture, zoom, and focus, and an image sensor for converting light (video) entering through the optical lens unit into an electrical video signal. As the image sensor, generally, a complementary metal-oxide-semiconductor (CMOS) sensor or a charge-coupled device (CCD) sensor is used. The image capturing unit 102 is controlled by the control unit 101 so that the image sensor converts object light formed into an image on a lens included in the image capturing unit 102 into an electric signal. Then, the image capturing unit 102 performs a noise reduction process on the electric signal, and outputs digital data as image data. In the digital camera 100 according to the present embodiment, the image data is encoded by the control unit 101 and recorded as a file in a recording medium 110 in compliance with the Design Rule for Camera File system (DCF) standard.

A non-volatile memory 103 is an electrically erasable and recordable non-volatile memory and stores a program described below to be executed by the control unit 101. A work memory 104 is used as a buffer memory for temporarily holding image data captured by the image capturing unit 102, an image display memory for a display unit 106, and a work area for the control unit 101.

An operation unit 105 is used to receive an instruction to operate the digital camera 100 from a user. The operation unit 105 includes, for example, a power button for the user to give an instruction to power on or off the digital camera 100, a release switch for giving an instruction to capture an image, and a reproduction button for giving an instruction to reproduce image data. The operation unit 105 further includes an operation member such as a dedicated connection button for starting communication with an external device via a communication unit 111 to be described below. Further, the operation unit 105 also includes a touch panel formed on the display unit 106. To detect a pressing state in two steps, the release switch includes switches SW1 and SW2. The release switch enters a so-called half press state, thereby turning on the switch SW1. Consequently, the operation unit 105 receives an instruction to make an image capturing preparation such as an autofocus (AF) process, an automatic exposure (AE) process, an automatic white balance (AWB) process, or a pre-flash (EF) process. The release switch enters a so-called full press state, thereby turning on the switch SW2. Consequently, the operation unit 105 receives an instruction to capture an image.

The display unit 106 displays a viewfinder image when an image is captured, displays captured image data, and displays characters for an interactive operation. The display unit 106 may also be external to the digital camera 100. The digital camera 100 only needs to be connectable to the display unit 106 internal or external to the digital camera 100 and have at least a display control function for controlling the display of the display unit 106. The operation unit 105 and the display unit 106 constitute a user interface of the digital camera 100.

The recording medium 110 can record a file of image data output from the image capturing unit 102. The recording medium 110 may be configured to be attachable to and detachable from the digital camera 100, or may be built into the digital camera 100. In other words, the digital camera 100 is to include at least a method for accessing the recording medium 110.

The communication unit 111 is an interface for connecting to an external apparatus. The digital camera 100 according to the present embodiment can exchange data with the external apparatus via the communication unit 111. For example, the digital camera 100 can transmit image data created by the image capturing unit 102 to the external apparatus via the communication unit 111. In the present embodiment, the communication unit 111 includes an interface for communicating with the external apparatus via a so-called wireless local area network (LAN) compliant with the Institute of Electrical and Electronics Engineers (IEEE) 802.11 standard. The control unit 101 controls the communication unit 111 to achieve wireless communication with the external apparatus. The communication method is not limited to the wireless LAN, and can include an infrared communication method, a Bluetooth® communication method, and a wireless communication method based on Wireless Universal Serial Bus (USB). In addition, a wired connection such as a USB cable, High-Definition Multimedia Interface (HDMI)®, IEEE 1394, and Ethernet may be employed.

A short-range communication unit 112 includes, for example, an antenna for wireless communication, a modulation/demodulation circuit for processing a wireless signal, and a communication controller. The short-range communication unit 112 outputs a modulated wireless signal from the antenna and demodulates a wireless signal received by the antenna, thereby achieving short-range communication compliant with the International Organization for Standardization (ISO)/International Electrotechnical Commission (IEC) 18092 standard (so-called near-field communication (NFC)). In addition, the short-range communication unit 112 may achieve short-range wireless communication based on an infrared communication method, a Bluetooth® communication method, or a wireless communication method based on Wireless USB. The short-range communication unit 112 according to the present embodiment is provided in a side portion of the digital camera 100.

In the present embodiment, the digital camera 100 is connected with a smart device 200 by the communication unit 111 starting communication. Further, the communication unit 111 of the digital camera 100 according to the present embodiment has an access point (AP) mode where the digital camera 100 operates as an access point in an infrastructure mode, and a client (CL) mode where the digital camera 100 operates as a client in the infrastructure mode. Then, the digital camera 100 according to the present embodiment causes the communication unit 111 to operate in the CL mode so that the digital camera 100 can operate as a CL device in the infrastructure mode. When the digital camera 100 operates as the CL device, the digital camera 100 can connect to an AP device near the digital camera 100 to participate in a network formed by the AP device. Further, the digital camera 100 according to the present embodiment can cause the communication unit 111 to operate in the AP mode so that the digital camera 100 can operate as a simplified AP, which is a type of AP with limited functions. If the digital camera 100 operates as the simplified AP, the digital camera 100 forms a network by itself. An apparatus near the digital camera 100 recognizes the digital camera 100 as an AP device and can participate in the network formed by the digital camera 100. A program for causing the digital camera 100 to operate as described above is held in the non-volatile memory 103. The user selects the AP mode or the CL mode by operating the operation unit 105.

The digital camera 100 according to the present embodiment is a simplified AP that is a type of AP but does not have a gateway function for transferring data received from a CL device to an Internet provider. Thus, even if the digital camera 100 receives data from another apparatus participating in the network formed by the digital camera 100, the digital camera 100 cannot transfer the data to a network such as the Internet.

Figure 1B:
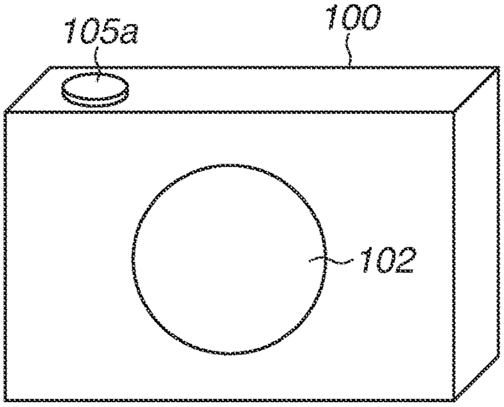
Figure 1C:
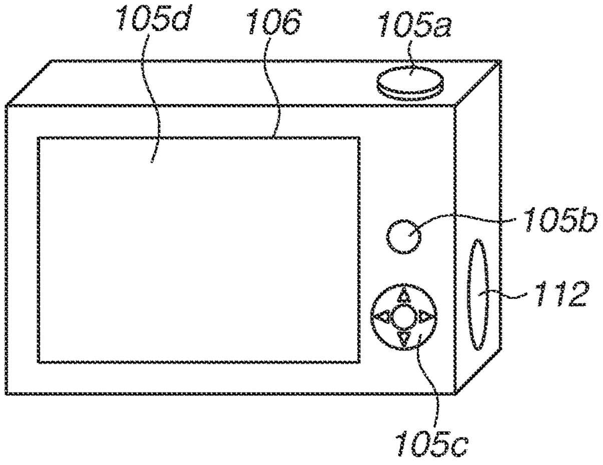

Next, an external appearance of the digital camera 100 is described. FIGS. 1B and 1C are diagrams illustrating examples of the external front face and the external back face of the digital camera 100. A release switch 105*a*, a play button 105*b*, a directional button 105*c*, and a touch panel 105*d* are the operation members included in the operation unit 105. The display unit 106 displays an image obtained as a result of the image capturing unit 102 capturing an image. The configuration of the digital camera 100 according to the embodiment has been described as above.

<Internal Configuration of Smart Device 200>

Figure 2:
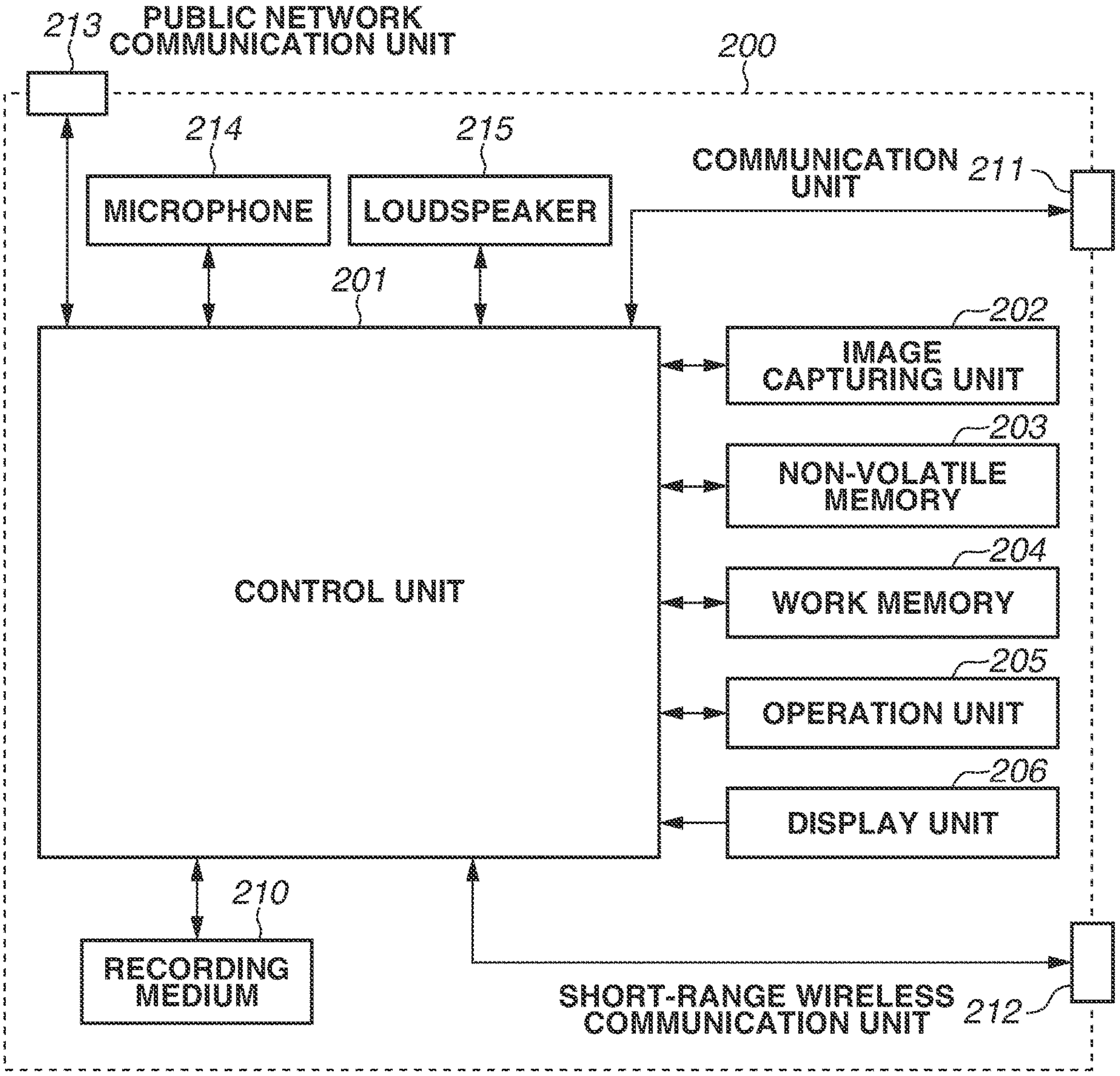
FIG. 2 is a block diagram illustrating a configuration of a smart device according to the embodiment.

FIG. 2 is a block diagram illustrating an example of a configuration of the smart device 200, which is an example of an information processing apparatus that communicates with the digital camera 100 according to the present embodiment. A "smart device" refers to a mobile terminal such as a smartphone or a tablet device. Further, although a smart device is described as an example of the information processing apparatus, the information processing apparatus is not limited to this. For example, the information processing apparatus may be a digital camera, a printer, a television, or a personal computer having a wireless function.

A control unit 201 controls each component of the smart device 200 based on an input signal and a program described below. Instead of the control unit 201 controlling the entire apparatus, a plurality of hardware components can share processing to control the entire apparatus.

An image capturing unit 202 converts object light formed into an image on a lens included in the image capturing unit 202 into an electric signal, performs a noise reduction process on the electric signal, and outputs digital data as image data. The captured image data is stored in a buffer memory, is subjected to a predetermined calculation and an encoding process by the control unit 201, and is recorded as a file in a recording medium 210.

A non-volatile memory 203 is an electrically erasable and recordable non-volatile memory. In the non-volatile memory 203, an operating system (OS), which is basic software to be executed by the control unit 201, and an application that cooperates with the OS to achieve an applicative function are recorded. Further, in the present embodiment, an application (hereinafter, an "app") for communicating with the digital camera 100 is stored in the non-volatile memory 203.

A work memory 204 is used as an image display memory for a display unit 206 and a work area for the control unit 201. An operation unit 205 is used to receive an instruction to the smart device 200 from a user. The operation unit 205 includes, for example, a power button for the user to give an instruction to power on or off the smart device 200, and operation members such as a touch panel formed on the display unit 206. The display unit 206 displays image data and displays characters for an interactive operation. The display unit 206 may also be external to the smart device 200. The smart device 200 only needs to be connectable to the display unit 206 and have at least a display control function for controlling the display of the display unit 206. The operation unit 205 and the display unit 206 constitute a user interface of the smart device 200.

The recording medium 210 can record image data output from the image capturing unit 202. The recording medium 210 may be configured to be attachable to and detachable from the smart device 200, or may be built into the smart device 200. In other words, the smart device 200 needs to have at least a means for accessing the recording medium 210.

A communication unit 211 is an interface for connecting to an external apparatus. The smart device 200 according to the present embodiment can exchange data with the digital camera 100 via the communication unit 211. In the present embodiment, the communication unit 211 is an antenna, and the control unit 201 can connect to the digital camera 100 via the antenna. The connection to the digital camera 100 may be a direct connection or a connection via an access point. As a protocol for communicating the data, for example, Hypertext Transfer Protocol (HTTP) is used. Alternatively, Picture Transfer Protocol over Internet Protocol (PTP/IP) via a wireless LAN can also be used. The communication with the digital camera 100 is not limited to this. For example, the communication unit 211 can include an infrared communication module, a Bluetooth® communication module, and a wireless communication module based on Wireless Universal Serial Bus (USB). In addition, a wired connection such as a USB cable, HDMI®, IEEE 1394, and Ethernet may be employed.

A short-range wireless communication unit 212 is a communication unit for achieving contactless short-range communication with another device. The short-range wireless communication unit 212 includes, for example, an antenna for wireless communication, a modulation/demodulation circuit for processing a wireless signal, and a communication controller. The short-range wireless communication unit 212 outputs a modulated wireless signal from the antenna and demodulates a wireless signal received by the antenna, thereby achieving contactless short-range communication. In this case, the short-range wireless communication unit 212 achieves contactless communication compliant with the ISO/IEC 18092 standard (so-called NFC). If receiving a data reading request from another device, the short-range wireless communication unit 212 outputs response data based on data stored in the non-volatile memory 203.

A public network communication unit 213 is an interface used to perform public wireless communication. The smart device 200 enables a telephone call with another device via the public network communication unit 213. At this time, the control unit 201 achieves the telephone call by inputting and outputting sound signals via a microphone 214 and a loudspeaker 215. In the present embodiment, the public network communication unit 213 is an antenna, and the control unit 201 can connect to a public network via the antenna. A single antenna can be used both as the communication unit 211 and the public network communication unit 213. The smart device 200 according to the embodiment has been described as above.

<System Configuration>

Figure 3:
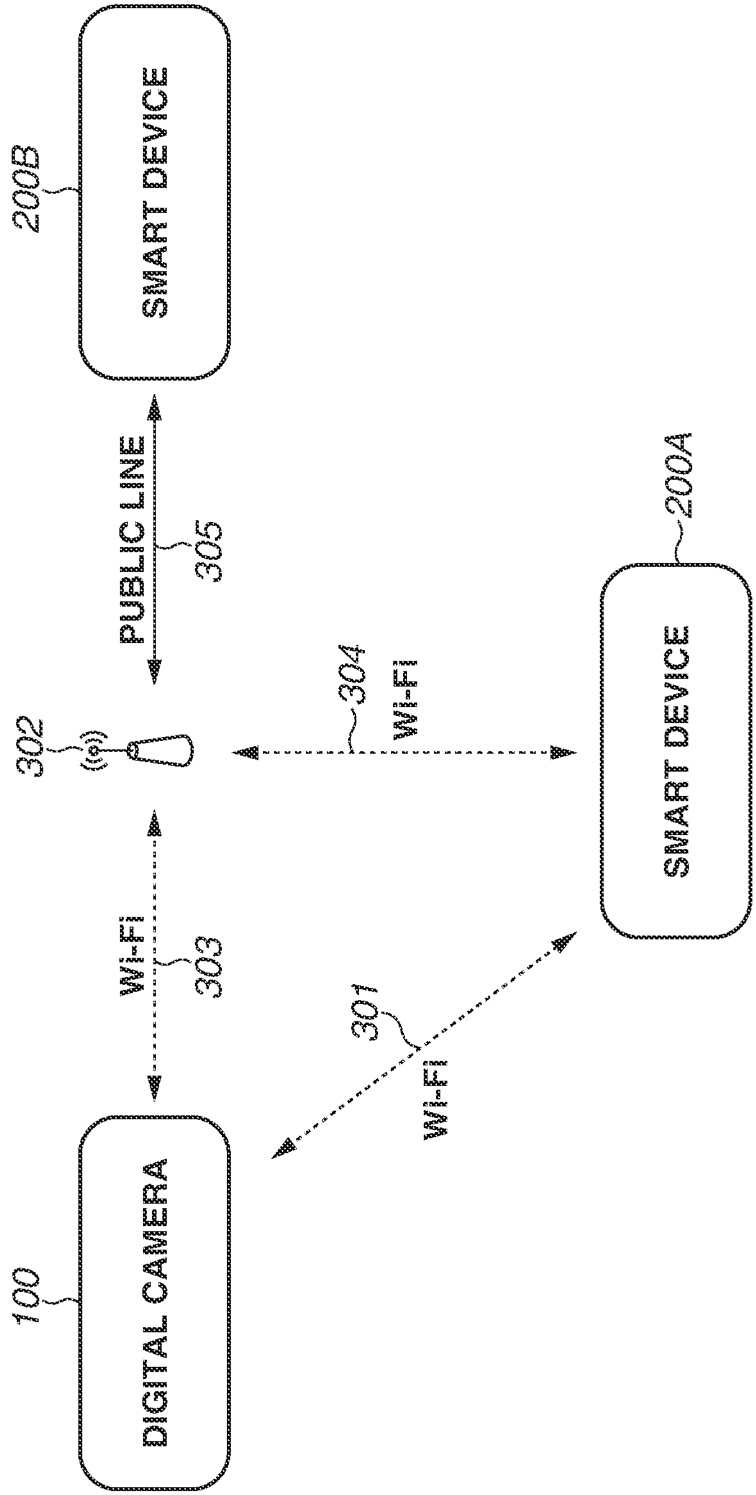
FIG. 3 is a block diagram illustrating a system configuration according to the embodiment.

FIG. 3 is a diagram illustrating a system configuration in which the smart device 200 controls the digital camera 100 using communication application programming interfaces (APIs) of the digital camera 100 via a network.

There are three types of system configuration for controlling the digital camera 100 using the communication APIs.

In the first configuration, as indicated by communication 301, the digital camera 100 and a smart device 200A are connected together in a peer-to-peer manner. At this time, the digital camera 100 serves as a Wi-Fi access point and constructs a LAN. The smart device 200A serves as a Wi-Fi client and joins the LAN constructed by the digital camera 100. In the present embodiment, an example has been used where the communication 301 is connected through Wi-Fi, but the communication 301 may also be connected through a wired connection such as Ethernet.

In the second configuration, as indicated by a network router 302, communication 303, and communication 304, the digital camera 100 and the smart device 200A are connected together via the network router 302. At this time, the network router 302 serves as a Wi-Fi access point in constructing a LAN. The digital camera 100 and the smart device 200A serve as Wi-Fi clients and join the LAN constructed by the network router 302. In the present embodiment, an example has been used where the communication 303 and the communication 304 are connected via Wi-Fi, but may be connected through a wired connection such as Ethernet.

In the third configuration, as indicated by the network router 302, the communication 303, and a public line 305, a smart device 200B is connected to the digital camera 100 via the public line 305. In the first two system configurations described above, connections are made in the same LAN. On the other hand, in this configuration, for example, by using a virtual private network (VPN), the smart device 200B can communicate with the digital camera 100 via the Internet from a place outside the LAN and away from the digital camera 100. The VPN is a known technique, and therefore is not described herein.

In the three types of system configurations described above, the smart device 200 can use the communication APIs of the digital camera 100.

<Basic Configurations of Communication APIs Published by Digital Camera 100>

FIGS. 4, 5, 7, 9, 11, 13, 15, and 17 are tables illustrating configurations of the communication APIs for controlling the digital camera 100 from an external device such as the smart device 200.

The digital camera 100 publishes the communication APIs for controlling the digital camera 100 from an external device such as the smart device 200. By receiving a request using any of these APIs, the digital camera 100 according to the present embodiment transmits device information recorded in the non-volatile memory 103 or a content file saved in the recording medium 110 to the external device via the communication unit 111. The "content file" refers to an image file created by the digital camera 100 and saved in the recording medium 110 or the non-volatile memory 103. In the present embodiment, the content file refers to a still image file of a captured still image or a moving image file of a captured moving image.

A program corresponding to each of the communication APIs is saved in advance in the non-volatile memory 103. If communication with the external device via the communication unit 111 is established, the control unit 101 loads the program corresponding to the communication API into the work memory 104 and waits for a request using the communication API from the external apparatus. If the control unit 101 detects a request using the communication API from the external device, the control unit 101 executes processing corresponding to the type of the communication API and returns a result of the processing as a response to the external device. The program corresponding to the communication API is executed in a communication protocol defined by the digital camera 100, and the external device communicates with the digital camera 100 using the defined communication protocol, and makes a request using the communication API. In the present embodiment, the program corresponding to this communication API is executed in HTTP. In other words, the digital camera 100 functions as an HTTP server. In the present embodiment, a description is given by exemplifying a case where the communication API is implemented as a web API.

The communication protocol is not limited to HTTP, and may be another protocol. Since the HTTP protocol is widely used, a description of the HTTP protocol is omitted herein.

A method for executing the program corresponding to the communication API in HTTP is carried out in the following procedure.

First, with regard to a Uniform Resource Locator (URL) published as the communication API, the external device describes necessary instruction information according to the specifications of the communication API at the access destination as text data in an HTTP request body. Then, the external device transmits the HTTP request body to the digital camera 100 using any of four HTTP methods, i.e., GET (read), POST (create), PUT (update), and DELETE (delete).

The digital camera 100 that has received the request performs processing based on the URL, the HTTP method, and the content of the instruction information in the HTTP request body, adds the result of the processing to an HTTP response body together with an HTTP status code, and returns the HTTP response body to the external device. The method for executing the program corresponding to the communication API in HTTP is carried out in the above procedure.

In the communication API, data to be described in the HTTP request body and the HTTP response body is represented by JavaScript® Object Notation (JSON), which is one of data description languages. In each communication API, the specifications of JSON syntax corresponding to the function of the communication API is defined, and the digital camera 100 and the smart device 200 make a request or analyze a response in compliance with the specifications.

While JSON is used in the present embodiment, Extensible Markup Language (XML) may also be used, or text data or binary data defined in a unique format may also be used.

Next, the configuration of the communication API is described in detail.

In the descriptions below, for ease of description, not only an interface but also a service corresponding to the communication API or a program for implementing the service is also simply referred to as the API or the communication API. More specifically, the process of executing a program for implementing a service corresponding to the API is described as executing the API. Further, the process of making a request via an API to execute a service corresponding to the API is described as requesting the API.

FIG. 4 is a table illustrating the basic configurations of the communication APIs.

First, a description is given of an HTTP method to be used in the communication APIs according to the present embodiment. There are four HTTP methods to be used in the communication APIs according to the present embodiment, i.e., GET 401, POST 402, PUT 403, and DELETE 404. Although there are other methods in the HTTP standard, the HTTP methods to be used in the communication APIs according to the present embodiment is limited to the four methods representing permanent basic functions included in almost all computer software, such as to read, create, update, and delete. The meaning of each of the four methods in the communication APIs is described below.

The GET 401 is used to acquire a content (image file), information about a camera and a state of the camera, and a capability value or a setting value of a setting item.

The POST 402 is used to save data such as a content file in the digital camera 100 from the external apparatus or execute a function of the camera such as execution of image capturing or performing a zoom operation.

The PUT 403 is used to change a setting value of a menu setting or an imaging parameter setting of the digital camera 100.

The DELETE 404 is used to delete a content or initialize a setting value.

By narrowing down to the above four methods, complex control of the HTTP methods becomes unnecessary. Thus, a programmer who creates a control program of the smart device 200 for controlling the digital camera 100 can create a program by only using minimum and frequently used HTTP methods.

Next, a top URL of the communication API according to the present embodiment is described. The top URL is a URL defined as a URL to be first accessed by a client to control the digital camera 100. A controller needs to access the top URL before using another API for remotely controlling the camera.

A URL 405 in FIG. 4 is the top URL of the communication API. A host name and a domain name of the top URL include an Internet Protocol (IP) address and a port number assigned to the digital camera 100. After the IP address and the port number, the top URL further includes a directory indicating the communication API and a directory indicating a version of the communication API. For example, if the IP address assigned to the digital camera 100 is 192.168.1.1, and the port number assigned to the digital camera 100 is 8080, the top URL is as follows.

http://192.168.1.1:8080/api/ver1

If the smart device 200, which is an HTTP client, requests the top URL of the communication API published by the digital camera 100, which is an HTTP server, using the GET 401, the digital camera 100 returns a response body (JSON) indicated in an API 406. In the API 406, a list of communication APIs with which the digital camera 100 is compatible is described. What is characteristic is that JSON syntax provides information about which HTTP methods are supported for each URL. By accessing the top URL, the smart device 200 can obtain the types of the communication API with which the digital camera 100 is compatible.

Next, an API table 407 is a table illustrating categories of the communication API. The communication API according to the present embodiment indicates that URLs are classified into a plurality of categories based on types of functions. In the URL notation of each of the API categories in the table, the top URL is omitted. Actually, an API category 408 is as follows.

http://192.168.1.1:8080/api/ver1/deviceinformation

Next, functional categorization of the communication APIs is described. First, the API category 408 is a category for acquiring fixed information about the digital camera 100. Next, an API category 409 is a category for acquiring state information about the digital camera 100. Then, an API category 410 is a category for acquiring or changing a menu setting of the digital camera 100, and executing a menu function. An API category 411 is a category for executing an image capturing function of the digital camera 100. An API category 412 is a category for acquiring or changing the setting of an imaging parameter of the digital camera 100. An API category 413 is a category for acquiring a through image to be output from the digital camera 100. An API category 414 is a category for acquiring event information to be issued by the digital camera 100. An API category 415 is a category for acquiring a content saved in a medium attached to the digital camera 100.

As described above, what is characteristic is that since the communication APIs are categorized by URLs, it is obvious to the programmer who creates the control program of the smart device 200 for controlling the digital camera 100 at which URL a communication API that the programmer wishes to execute is located.

For an individual communication API, a URL is defined in a directory below the above-described API category.

The basic configurations of the APIs have been described as above. Next, the specifications of an individual API in each API category is described.

<APIs for Acquiring Fixed Information or State Information about Digital Camera 100>

An API table 500 in FIG. 5 is a table illustrating an API group for acquiring fixed information or state information about the digital camera 100 and illustrates APIs belonging to the API categories 408 and 409 in FIG. 4. In the notation in the table, an API name (URL) is abbreviated. Actually, an API 502 is as follows.

http://192.168.1.1:8080/api/ver1/devicestatus/storage

In the notation of all the APIs in the table described below, the API name (URL) is abbreviated.

An API 501 is an API for acquiring the fixed information about the digital camera 100. If this API is executed using the GET 401, fixed device information that basically does not change such as a product name, a manufacturer name, a firmware version, and a serial number can be acquired. Although not illustrated, the fixed device information also includes a media access control (MAC) address.

The API 502 is an API for acquiring information about the recording medium 110 such as a medium attached to the digital camera 100. If this API is executed using the GET 401, a type of the medium such as a Secure Digital (SD) card or a Compact Flash (CF) card, an access capability (Read/

Write, Read Only, or Write Only), the maximum saving capacity, the current free space, and the total number of saved contents can be acquired.

An API 503 is an API for acquiring information about a battery (not illustrated in FIGS. 1A, 1B, and 1C) attached to the digital camera 100. If this API is executed using the GET 401, a name of the battery, a remaining amount of the battery, and a degree of deterioration of the battery can be acquired.

The state information about the digital camera 100 also includes, in addition to the above, an internal temperature of the digital camera 100, and if the digital camera 100 is a digital camera including an interchangeable lens, lens information such as a product name and a type of a lens attached to the digital camera 100.

The APIs 502 and 503 are APIs for acquiring the state information about the digital camera 100, and therefore are characterized in that the URLs of the APIs 502 and 503 are defined in directories in the same API category.

Figure 6:
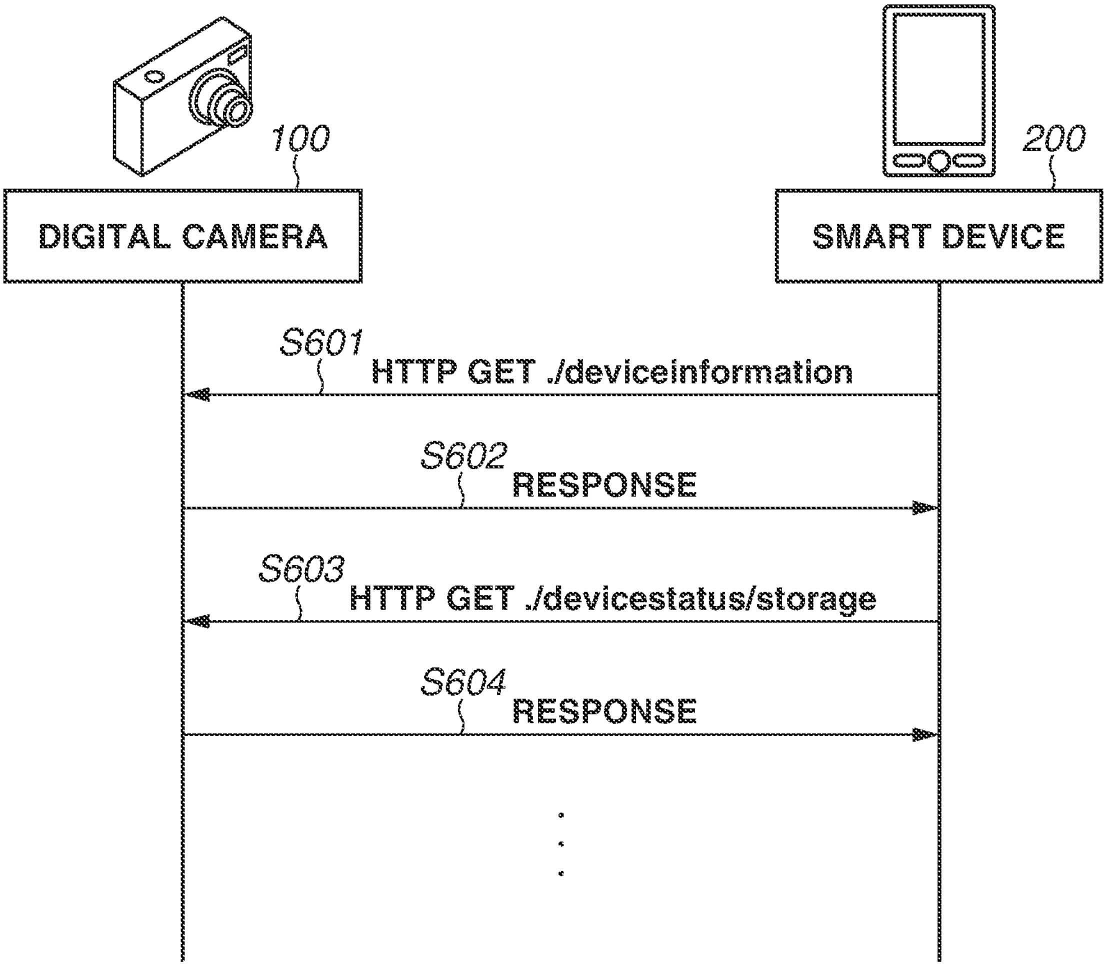
FIG. 6 is a sequence diagram in a case where the API for acquiring the fixed information or the state information regarding the digital camera according to the embodiment is executed.

FIG. 6 is a sequence illustrating a flow of processing when the digital camera 100 and the smart device 200 are connected together, and the communication APIs illustrated in FIG. 5 are executed. A Wi-Fi connection process and a device detection process required to execute the APIs are assumed to be already executed, and are not described herein.

Steps S601 and S602 are a sequence when the API 501 is executed. Steps S603 and S604 are a sequence when the API 502 is executed.

In step S601, the control unit 201 of the smart device 200 requests the API 501 from the digital camera 100 using the GET 401 via the communication unit 211.

In step S602, if the control unit 101 of the digital camera 100 detects receipt of the request via the communication unit 111, the control unit 101 acquires the product name, the manufacturer name, the firmware version, and the serial number from the non-volatile memory 103. Then, the control unit 101 formats the acquired information into a data set based on response JSON syntax. Further, the control unit 101 describes the formatted data set in a response body and transmits the response body to the smart device 200 via the communication unit 111.

In step S603, the control unit 201 of the smart device 200 requests the API 502 from the digital camera 100 using the GET 401 via the communication unit 211.

In step S604, if the control unit 101 of the digital camera 100 detects receipt of the request via the communication unit 111, the control unit 101 acquires various pieces of information from the recording medium 110 or the non-volatile memory 103. The information to be acquired at this time is, for example, a type of the medium, an access capability, the maximum saving capacity, the free space, and the total number of saved contents of the recording medium 110. The acquired information is formatted into a data set based on the response JSON syntax.

Then, the control unit 101 describes the formatted data set in a response body and transmits the response body to the smart device 200 via the communication unit 111. All the APIs belonging to this API category, including the API 503, are processed similar to steps S603 and S604, and therefore, the processing of the other APIs is not described herein.

The APIs for acquiring the fixed information or the state information about the digital camera 100 have been described as above.

<APIs for Acquiring or Changing Setting of Menu Function of Digital Camera 100>

An API table 700 in FIG. 7 is a table illustrating an API group for acquiring or changing the setting of the menu function of the digital camera 100 and illustrates APIs belonging to the API category 410 in FIG. 4. The menu function of the digital camera 100 according to the present embodiment refers to various setting items listed in a menu format.

An API 701 is an API for acquiring or changing date and time information that can be set by the menu function of the digital camera 100. The date and time information of this API is written in a format compliant with Request for Comments (RFC) 1123. The date and time information may be written in compliance with another standard or written based on a unique format. If this API is executed using the GET 401, the date and time information set in the digital camera 100 can be acquired. Further, if the setting value of the date and time is described in a request body in conformity with a defined notation, and the API is executed using the PUT 403, the setting value of the date and time described in the request body is reflected on the digital camera 100.

An API 702 is an API for acquiring, changing, or deleting setting information about a copyright holder name, which is one of pieces of meta-information recorded in a content (image) file created by capturing an image. If this API is executed using the GET 401, the currently set copyright holder name can be acquired. Further, if the copyright holder name is described in a request body, and the API is executed using the PUT 403, the copyright holder name described in the request body is reflected on the digital camera 100. If the API is executed using the DELETE 404, the copyright holder name is changed to an initial value. Since the initial value is in an empty state in the present embodiment, the recorded copyright holder name is cleared.

The menu setting of the digital camera 100 is not limited to the above. Although not illustrated, the menu setting includes designation of the format of the recording medium 110, setting of the operation sound of the digital camera 100, and an auto power off setting for setting the time until the digital camera 100 is automatically powered off.

What is characteristic here is the following point. The specification of an API in FIG. 7 is such that, in the case of a method in which both a request and a response are accompanied by JSON syntax as in the PUT method, the JSON syntax to be described in the response body and the JSON syntax to be described in the request body are in the same format. More specifically, in the API 701, in both a request and a response, two field names "datetime" and "dst" in JSON are the same, and the formats of the values are also the same format compliant with RFC 1123. Similarly, in the API 702, the field names in JSON are "copyright", which is the same. With such a specification, since the JSON syntax is the same, the programmer who creates the control program of the smart device 200 for controlling the digital camera 100 does not have to write a processing program differently for each of the HTTP methods. The programmer duplicates the JSON syntax described in a response body transmitted from the digital camera 100 and changes only a necessary portion of the duplicated JSON syntax. Then, the programmer can utilize the resulting JSON syntax as it is as JSON syntax to be described in a request body when the PUT method is executed. This provides an advantage in that the amount of programming is reduced.

Figure 8:
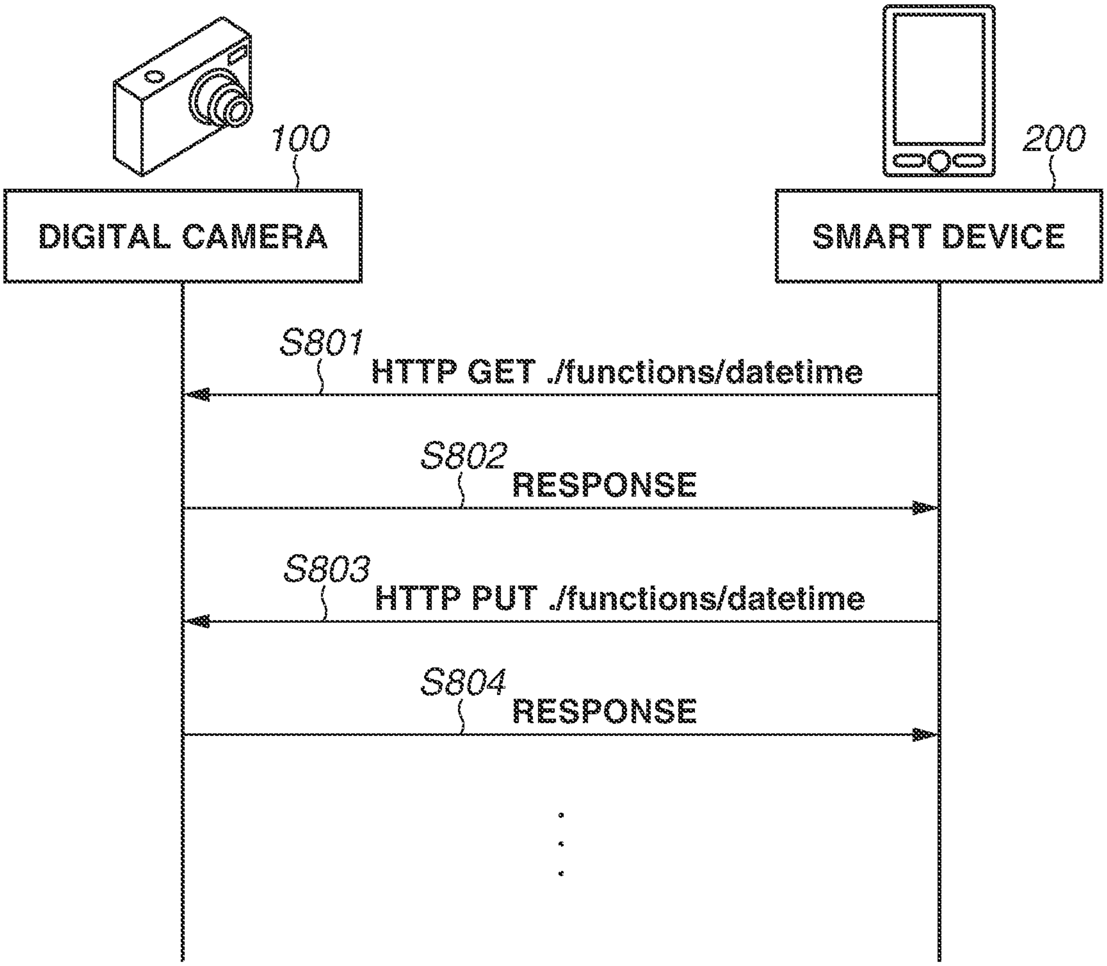
FIG. 8 is a sequence diagram in a case where the API for acquiring or changing the menu setting of the digital camera according to the embodiment is executed.

FIG. 8 is a sequence illustrating the flow of processing when the communication APIs illustrated in FIG. 7 are executed.

Steps S801, S802, S803, and S804 are a sequence when the API 701 is executed.

In step S801, the control unit 201 of the smart device 200 requests the API 701 from the digital camera 100 using the GET 401 via the communication unit 211.

In step S802, if the control unit 101 of the digital camera 100 detects receipt of the request via the communication unit 111, the control unit 101 acquires the date and time information from the non-volatile memory 103 and formats the date and time information into a data set based on response JSON syntax. Then, the control unit 101 describes the formatted data set in a response body and transmits the response body to the smart device 200 via the communication unit 111.

In step S803, the control unit 201 of the smart device 200 formats the date and time information recorded in the work memory 204 through program processing into a data set based on request JSON syntax and describes the data set in a request body. Then, the control unit 201 requests the API 701 from the digital camera 100 using the PUT 403 via the communication unit 211.

In step S804, if the control unit 101 of the digital camera 100 detects receipt of the request via the communication unit 111, the control unit 101 analyzes the JSON syntax described in the request body and records the requested date and time information in the non-volatile memory 103. When the setting is completed, the control unit 101 formats the date and time information of which the setting is completed into a data set based on JSON syntax, describes the data set in a response body, and transmits the response body to the smart device 200 via the communication unit 111.

The API 702 is processed in a sequence similar to steps S801 to S804, and therefore, the processing of the API 702 is not described herein.

The APIs for acquiring or changing the menu setting of the digital camera 100 have been described as above.

<APIs for Executing Image Capturing Function of Digital Camera 100>

An API table 900 in FIG. 9 is a table illustrating an API group for executing the image capturing function of the digital camera 100 and illustrates APIs belonging to the API category 411 in FIG. 4.

An API 901 is an API for capturing a still image. By executing this API using the POST 402, the digital camera 100 executes an image capturing process and records a created content (still image) file in the recording medium 110.

An API 902 is an API for executing capturing of a moving image using the digital camera 100. If this API is executed using the POST method, it is possible to instruct the digital camera 100 to start and stop the capturing of a moving image. If this API is executed using the POST 402, the digital camera 100 saves a created content (moving image) file in the recording medium 110.

Figure 10:
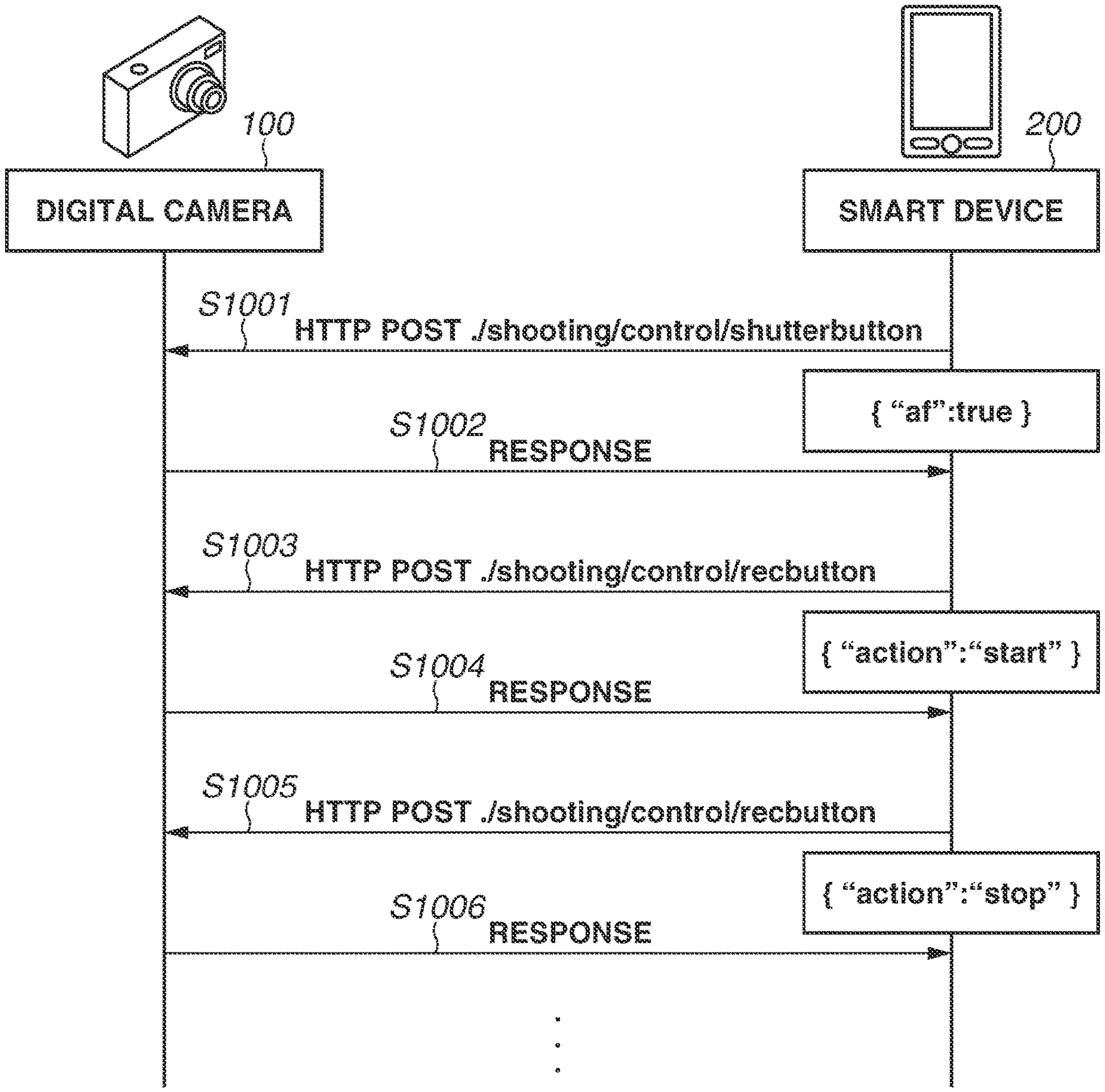
FIG. 10 is a sequence diagram in a case where the API for executing the image capturing function of the digital camera according to the embodiment is executed.

FIG. 10 is a sequence illustrating the flow of processing when the communication APIs illustrated in FIG. 9 are executed.

Steps S1001 and S1002 are a sequence when the API 901 is executed. Steps S1003, S1004, S1005, and S1006 are a sequence when the API 902 is executed.

In step S1001, the control unit 201 of the smart device 200 acquires a still image capturing instruction recorded in the work memory 204 through program processing. Then, the control unit 201 formats the still image capturing instruction into a data set based on request JSON syntax, describes the data set in a request body, and requests the API 901 from the digital camera 100 using the POST 402 via the communication unit 211. In step S1001, when a still image is captured, an instruction to execute AF is given. If the control unit 101 of the digital camera 100 detects receipt of the request via the communication unit 111, the control unit 101 executes an AF process and an image capturing process. If the image capturing process is completed, the control unit 101 records a created content (still image) file in the recording medium 110.

In step S1002, the control unit 101 formats the content file into a data set based on response JSON syntax. Then, the control unit 101 describes the formatted data set in a response body and transmits the response body to the smart device 200 via the communication unit 111.

In step S1003, the control unit 201 of the smart device 200 acquires a moving image capturing start instruction recorded in the work memory 204 through program processing. Then, the control unit 201 formats the moving image capturing start instruction into a data set based on the request JSON syntax, describes the data set in a request body, and requests the API 902 from the digital camera 100 using the POST 402 via the communication unit 211. In step S1003, an instruction to start the recording of a moving image is given. If the control unit 101 of the digital camera 100 detects receipt of the request via the communication unit 111, the control unit 101 starts a moving image recording process.

In step S1004, if a moving image recording start process is completed, the control unit 101 formats a content file into a data set based on the response JSON syntax. Then, the control unit 101 describes the formatted data set in a response body and transmits the response body to the smart device 200 via the communication unit 111.

In step S1005, the control unit 201 of the smart device 200 acquires a moving image capturing stop instruction recorded in the work memory 204 through program processing. Then, the control unit 201 formats the moving image capturing stop instruction into a data set based on the request JSON syntax, describes the data set in a request body, and requests the API 902 from the digital camera 100 using the POST 402 via the communication unit 211. In step S1005, an instruction to stop the recording of the moving image is given. If the control unit 101 of the digital camera 100 detects receipt of the request via the communication unit 111, the control unit 101 ends the recording of the moving image. If a moving image recording stop process is completed, the control unit 101 records a created content (moving image) file in the recording medium 110.

In step S1006, the control unit 101 formats the content file into a data set based on the response JSON syntax. Then, the control unit 101 describes the formatted data set in a response body and transmits the response body to the smart device 200 via the communication unit 111.

The APIs for executing the image capturing function of the digital camera 100 have been described as above.

<APIs for Acquiring or Changing Imaging Parameter of Digital Camera 100>

An API table 1100 in FIG. 11 is a table illustrating an API group for acquiring or changing an imaging parameter of the digital camera 100 and illustrates APIs belonging to the API category 412 in FIG. 4.

An API 1101 is an API for acquiring or changing the value of exposure compensation of the digital camera 100. If this API is executed using the GET 401, the current value and the settable values of exposure compensation set in the digital camera 100 can be acquired. If the value of exposure compensation is picked up from among the settable values and described in a request body, and the API is executed using the PUT 403, the value of exposure compensation described in the request body is reflected on the digital camera 100.

An API 1102 is an API for acquiring or changing the value of ISO sensitivity of the digital camera 100. If this API is executed using the GET 401, the current value and the settable values of ISO sensitivity set in the digital camera 100 can be acquired. If the value of ISO sensitivity is picked up from among the settable values and described in a request body, and the API is executed using the PUT 403, the value of ISO sensitivity described in the request body is reflected on the digital camera 100.

An API 1103 is an API for acquiring or changing the value of white balance of the digital camera 100. If this API is executed using the GET 401, the current value and the settable values of white balance set in the digital camera 100 can be acquired. If the value of white balance is picked up from among the settable values and described in a request body, and the API is executed using the PUT 403, the value of white balance described in the request body is reflected on the digital camera 100.

An API 1104 is an API for acquiring or changing the values of all imaging parameters of the digital camera 100. If this API is executed using the GET 401, the current value and the settable values of each of the imaging parameters set in the digital camera 100 can be acquired. If the value of a specific parameter is picked up from among the settable values and described in a request body, and the API is executed using the PUT 403, the value of the parameter described in the request body is reflected on the digital camera 100.

Examples of the imaging parameter include, in addition to the above, an aperture value (AV value), a time value (TV value), a color temperature, a still image capturing image quality, and a moving image capturing image quality.

What is characteristic here is that the specification of each API is such that JSON syntax to be described in the response body of each API belonging to this API category is in the same format. More specifically, a field name of the current value is uniformly referred to as "value", and the field name of the settable values is uniformly referred to as "ability". This enables to avoid the need to separate processing for each type of imaging parameter or each HTTP method. Thus, the programmer who creates the control program of the smart device 200 for controlling the digital camera 100 can process all the imaging parameters in the API category 412 using the same function. In other words, the programmer does not have to write processing differently for each type of imaging parameter. This provides an advantage in that the amount of programming is reduced.

Figure 12:
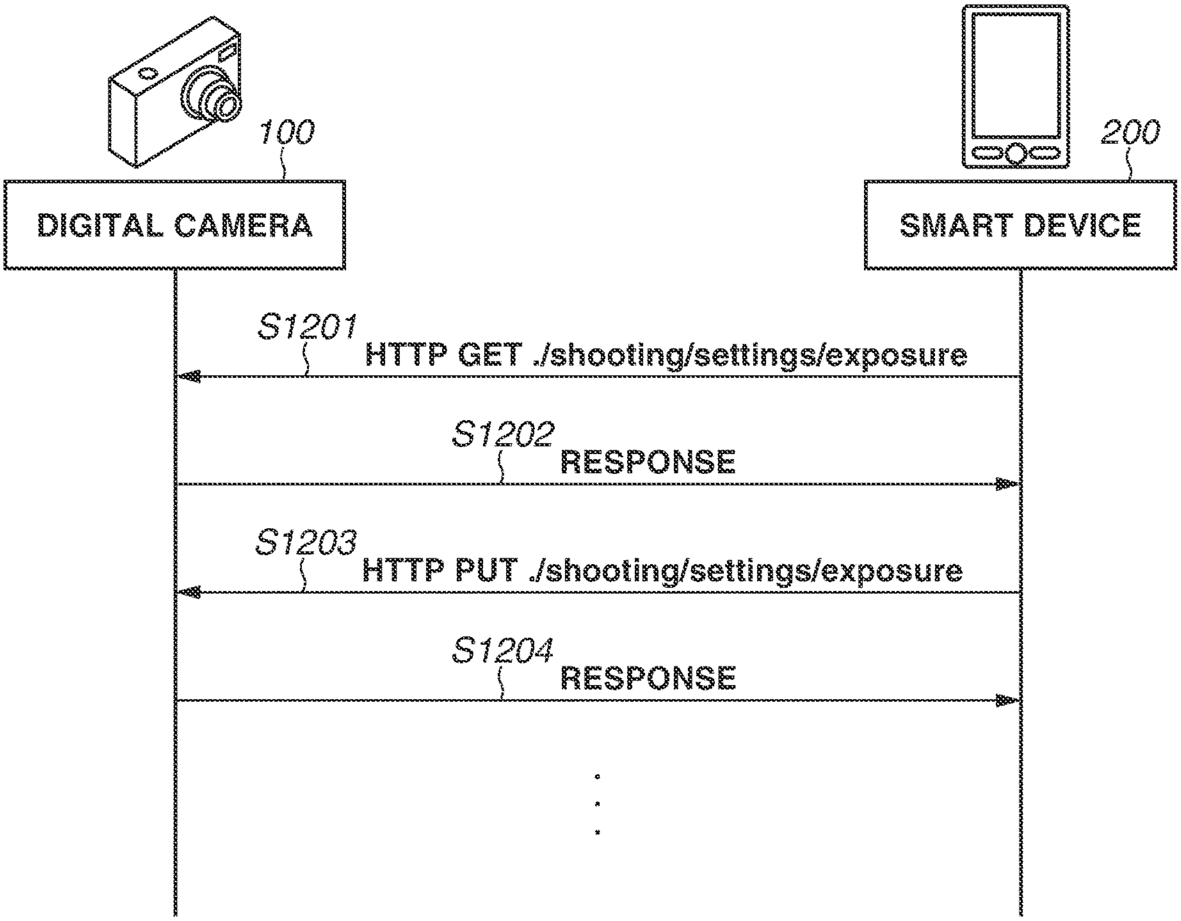
FIG. 12 is a sequence diagram in a case where the API for acquiring or changing the imaging parameter of the digital camera according to the embodiment is executed.

FIG. 12 is a sequence illustrating the flow of processing when the communication APIs illustrated in FIG. 11, such as API 1101, are executed.

Steps S1201, S1202, S1203, and S1204 are a sequence when the API 1101 is executed.

In step S1201, the control unit 201 of the smart device 200 requests the API 1101 from the digital camera 100 using the GET 401 via the communication unit 211.

In step S1202, if the control unit 101 of the digital camera 100 detects receipt of the request via the communication unit 111, the control unit 101 acquires the current value and the settable values of exposure compensation from the work memory 104 and the non-volatile memory 103. Then, the control unit 101 formats the current value and the settable values of exposure compensation into a data set based on response JSON syntax. The control unit 101 describes the formatted data set in a response body and transmits the response body to the smart device 200 via the communication unit 111.

In step S1203, the control unit 201 of the smart device 200 acquires the value of exposure compensation recorded in the work memory 204 through program processing. Then, the control unit 201 formats the value of exposure compensation into a data set based on request JSON syntax, describes the data set in a request body, and requests the API 701 from the digital camera 100 using the PUT 403 via the communication unit 211. If the control unit 101 of the digital camera 100 detects receipt of the request via the communication unit 111, the control unit 101 analyzes the JSON syntax described in the request body and records the requested value of exposure compensation in the work memory 104 or the non-volatile memory 103.

In step S1204, if the processing is completed, the control unit 101 formats the value of exposure compensation of which the setting is completed into a data set based on JSON syntax, describes the data set in a response body, and transmits the response body to the smart device 200 via the communication unit 111.

The APIs 1102 and 1103 are both processed in a sequence similar to the above, and therefore, the processing of the APIs 1102 and 1103 is not described herein. Since the same JSON syntax format is used, similar processing can be used also in the analysis of the JSON syntax in step S1203. This enables to implement an application more efficiently.

The APIs for acquiring or changing the imaging parameter of the digital camera 100 have been described as above.

<APIs for Acquiring Through Image Captured by Digital Camera 100>

An API table 1300 in FIG. 13 is a table illustrating an API group for acquiring a through image (remote live view image) captured by the digital camera 100 and illustrates APIs belonging to the API category 413 in FIG. 4.

An API 1301 is an API for giving an instruction to start and end generation of the through image by the digital camera 100. If an instruction regarding a size of the through image and whether to display the through image on the display unit 106 of the digital camera 100 are described in a request body, and the API is executed using the POST 402, the digital camera 100 starts and stops the generation of the through image based on content of the instruction.

The API 1302 is an API for acquiring one frame of the through image captured by the digital camera 100. If this API is executed using the GET 401, one frame of the through image set by the API 1301 can be acquired.

An API 1303 is an API for acquiring the through image captured by the digital camera 100 by chunked transfer. The chunked transfer is one of the data transfer mechanisms defined by HTTP 1.1 (RFC 2616). The chunked transfer is a transmission method in which, even if a size of entire response data is not known in advance, a response is returned with a description of a size of each chunk of data. Since the chunked transfer is a known technique, the detailed mechanism thereof is not described herein. If the API is executed using the GET 401, then as illustrated in the API table 1300, data of the through image is continuously transmitted in the order of size information regarding the through image and real data of the through image. If the API is executed using the DELETE 404, then as illustrated in the API table 1300, the size of the through image is transmitted as 0, whereby the chunked transfer of the through image stops.

Figure 14:
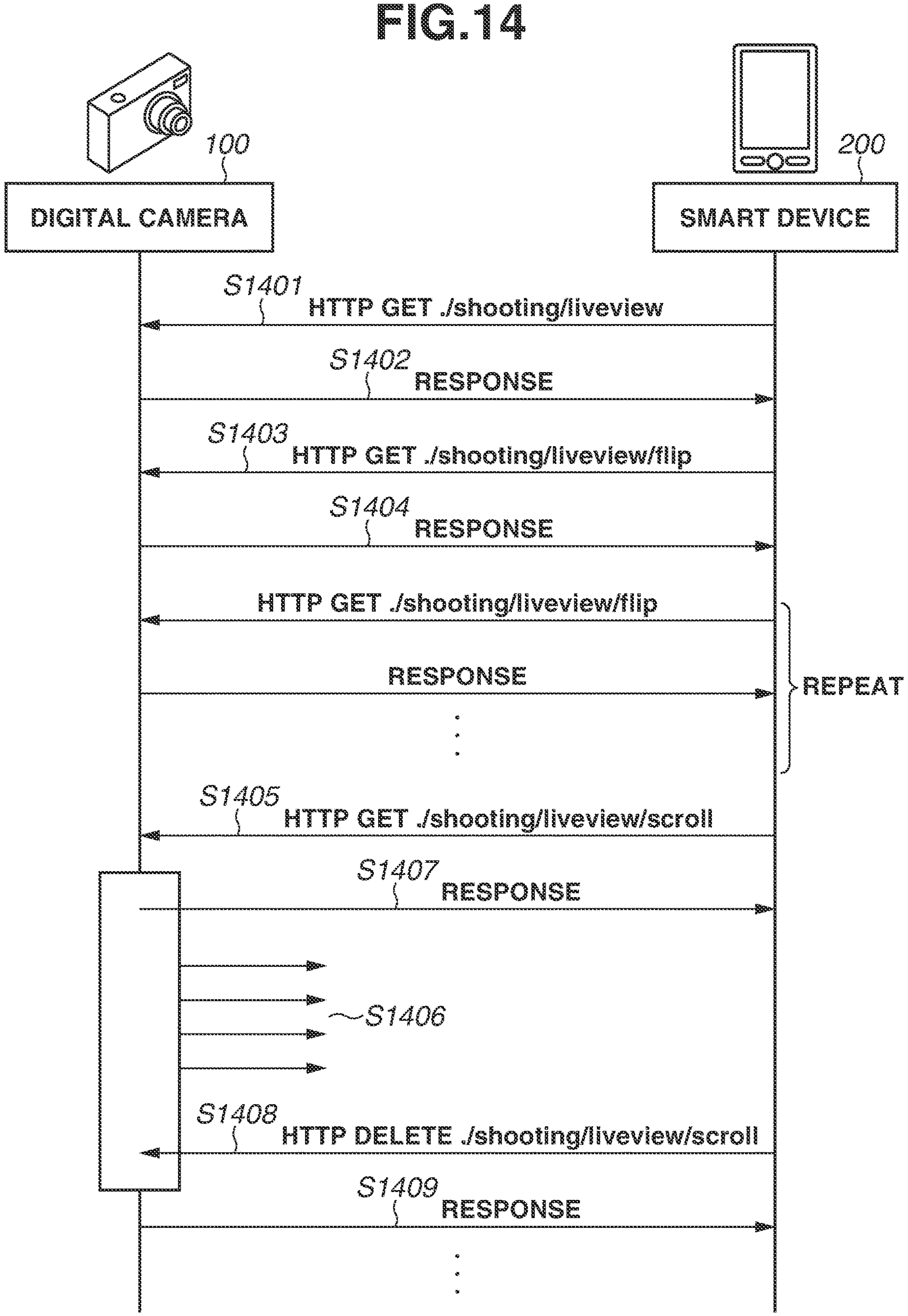
FIG. 14 is a sequence diagram in a case where the API for acquiring the through image of the digital camera according to the embodiment is executed.

FIG. 14 is a sequence illustrating the flow of processing when the communication APIs illustrated in FIG. 13 are executed.

Steps S1401 and S1402 are a sequence when the API 1301 is executed. Steps S1403 and S1404 are a sequence when the API 1302 is executed. Steps S1405, S1406, S1407, S1408, and S1409 are a sequence when the API 1303 is executed.

In step S1401, the control unit 201 of the smart device 200 acquires a value for starting generation of the through image recorded in the work memory 204 through program processing. Then, the control unit 201 formats the value for starting the generation of the through image into a data set based on request JSON syntax, describes the data set in a request body, and requests the API 1301 from the digital camera 100 using the POST 402 via the communication unit 211. In step S1401, in compliance with the specifications of the API 1301, an instruction that specifies the size of the through image and whether to display the through image on the display unit 106 of the digital camera 100 is given. If the control unit 101 of the digital camera 100 detects receipt of the request via the communication unit 111, the control unit 101 analyzes the JSON syntax described in the request body. Then, based on the requested instruction that specifies the size of the through image and whether to display the through image on the display unit 106 of the digital camera 100, the control unit 101 starts the process of generating the through image. The generated through image is primarily recorded in the work memory 104 sequentially.

In step S1402, when the above process is started, the control unit 101 formats values for a response into a data set based on JSON syntax, describes the data set in a response body, and transmits the response body to the smart device 200 via the communication unit 111.

In step S1403, the control unit 201 of the smart device 200 requests the API 1302 from the digital camera 100 using the GET 401 via the communication unit 211.

In step S1404, if the control unit 101 of the digital camera 100 detects receipt of the request via the communication unit 111, the control unit 101 sequentially acquires the temporarily recorded through image from the work memory 104 and formats the temporarily recorded through image into a response data set. Then, the control unit 101 describes the formatted data set in a response body and transmits the response body to the smart device 200 via the communication unit 111.

The smart device 200 repeatedly executes the API 1302, thereby achieving display of a live view on the smart device 200.

In step S1405, the control unit 201 of the smart device 200 requests the API 1303 from the digital camera 100 using the GET 401 via the communication unit 211. If the control unit 101 of the digital camera 100 detects receipt of the request via the communication unit 111, then in step S1406, the control unit 101 sequentially acquires the temporarily recorded through image from the work memory 104 and starts the chunked transfer of the temporarily recorded through image in the order of data illustrated in the API table 1300.

In step S1407, if the chunked transfer starts, the control unit 101 formats the through image into a response data set. Then, the control unit 101 describes the formatted data set in a response body and transmits the response body to the smart device 200 via the communication unit 111.

In step S1408, the control unit 201 of the smart device 200 requests the API 1303 from the digital camera 100 using the DELETE 404 via the communication unit 211. If the control unit 101 of the digital camera 100 detects receipt of the request via the communication unit 111, then as illustrated in the API table 1300, the control unit 101 transmits the size of the through image to be subjected to the chunked transfer as 0 and ends the chunked transfer.

In step S1409, if the chunked transfer ends, the control unit 101 formats a response data set. Then, the control unit 101 describes the formatted data set in a response body and transmits the response body to the smart device 200 via the communication unit 111.

The APIs for acquiring the through image of the digital camera 100 have been described as above.

<APIs for Acquiring Event Information Regarding Digital Camera 100>

An API table 1500 in FIG. 15 is a table illustrating an API group for acquiring the event information regarding the digital camera 100 and illustrates APIs belonging to the API category 414 in FIG. 4. In the present embodiment, the event information refers to information for notifying an external device of a change in the state of the digital camera 100. For example, the change in the state corresponds to a case where a remaining capacity of a battery is updated, content files saved in the recording medium 110 are increased or decreased, a setting is changed due to a user operating the digital camera 100, or an accessory such as a lens is attached to the digital camera 100. In the present embodiment, a description is given by exemplifying the case where the remaining capacity of the battery is updated.

An API 1501 is an API for acquiring the event information regarding the digital camera 100. The API can select from two methods. One is a method for immediately transmitting presence or absence and content of the event information as a response. The other is a method referred to as a long polling in which an HTTP session is continued by transmitting the HTTP status code 100 Continue until an event occurs and a response is transmitted when the event occurs. Specification of either of the methods is achieved by adding a URL query parameter to a URL. The URL query parameter is a known technique, and therefore is not described herein. As described in the API table 1500, to acquire the event information by the long polling, the smart device 200 requests the API 1501 at the following URL.

http://192.168.1.1:8080/api/ver1/event/polling?continue=on

In the URL, "?continue=on" is a query parameter. If no query parameter is specified, or if "?continue=off" is set, the digital camera 100 immediately transmits a response. If the API is executed using the GET 401, the digital camera 100 acquires the event information by the above-described method.

An API 1502 is an API for acquiring the event information regarding the digital camera 100 by the chunked transfer. The chunked transfer has been described above, and therefore is not described herein. If the API is executed using the GET 401, the event information continues to be transmitted. The specific transmission method for the chunked transfer is as follows. While there is no occurrence of an event, the digital camera 100 transmits "{ }" indicating that there is no event occurring. Since the size of "{ }" is 2 bytes, the digital camera 100 transmits "2"and"{ }" in this order. If an event occurs, the digital camera 100 transmits JSON indicating that the event has occurred. In the API 1500, JSON represents an example of a case where the remaining amount of the battery has changed. JSON syntax to be transmitted at this time is the same as JSON syntax to be transmitted as a response by an individual API. For example, battery information is the same as response information regarding the API 503. If the API is executed using the DELETE 404, then as illustrated in the API table 1500, the size of the event information is transmitted as 0, and the chunked transfer of the event information stops.

Figure 16:
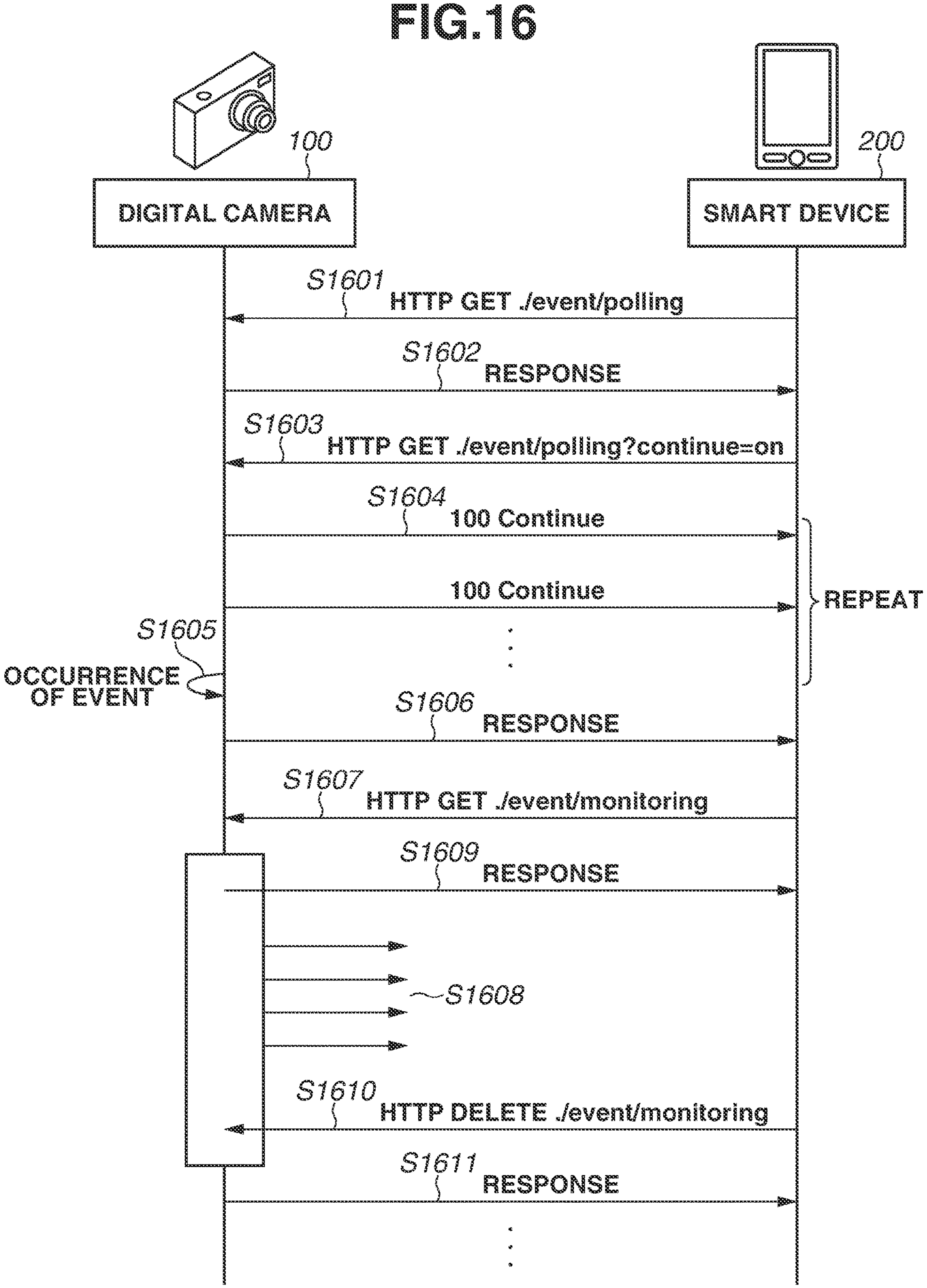
FIG. 16 is a sequence diagram in a case where the API for acquiring the event information regarding the digital camera according to the embodiment is executed.

FIG. 16 is a sequence illustrating the flow of processing when the communication APIs illustrated in FIG. 15 are executed.

Steps S1601, S1602, S1603, S1604, S1605, and S1606 are a sequence when the API 1501 is executed. Steps S1607, S1608, S1609, S1610, and S1611 are a sequence when the API 1502 is executed.

In step S1601, the control unit 201 of the smart device 200 requests the API 1501 from the digital camera 100 using the GET 401 via the communication unit 211. At this time, a URL query parameter is not added.

In step S1602, if the control unit 101 of the digital camera 100 detects receipt of the request via the communication unit 111, the control unit 101 acquires the event information recorded in the work memory 104 and formats the event information into a response data set. Then, the control unit 101 describes the formatted data set in a response body and transmits the response body to the smart device 200 via the communication unit 111. If the event information is not present, the control unit 101 transmits a response data set indicating that the event information is not present.

In step S1603, the control unit 201 of the smart device 200 requests the API 1501 from the digital camera 100 using the GET 401 via the communication unit 211. At this time, a URL query parameter indicating that long polling is to be executed is added.

If the event information is not present, then as illustrated in step S1604, the control unit 101 transmits the HTTP status code 100 Continue to the smart device 200 via the communication unit 111. The above processing is repeated until the event information occurs.

In step S1605, if the control unit 101 detects occurrence of an event, then in step S1606, the control unit 101 acquires the event information recorded in the work memory 104 and formats the event information into a response data set. Then, the control unit 101 describes the formatted data set in a response body and transmits the response body to the smart device 200 via the communication unit 111.

In step S1607, the control unit 201 of the smart device 200 requests the API 1502 from the digital camera 100 using the GET 401 via the communication unit 211.

If the control unit 101 of the digital camera 100 detects receipt of the request via the communication unit 111, then as illustrated in step S1608, the control unit 101 starts the chunked transfer of the event information acquired from the work memory 104 in the order of data illustrated in the API table 1500.

In step S1609, if the chunked transfer starts, the control unit 101 formats the event information into a response data set. Then, the control unit 101 describes the formatted data set in a response body and transmits the response body to the smart device 200 via the communication unit 111.

In step S1610, the control unit 201 of the smart device 200 requests the API 1502 from the digital camera 100 using the DELETE 404 via the communication unit 211. If the control unit 101 of the digital camera 100 detects receipt of the request via the communication unit 111, then as illustrated in the API table 1500, the control unit 101 transmits the size of the event information to be subjected to the chunked transfer as 0 and ends the chunked transfer.

In step S1611, if the chunked transfer ends, the control unit 101 formats a response data set. Then, the control unit 101 describes the formatted data set in a response body and transmits the response body to the smart device 200 via the communication unit 111.

The APIs for acquiring the event information regarding the digital camera 100 have been described as above.

<APIs for Acquiring Content File of Digital Camera 100>

An API table 1700 in FIG. 17 is a table illustrating an API group for acquiring a content (image) file saved in a medium attached to the digital camera 100, deleting the content file, and operating the content file. The API group includes APIs belonging to the API category 415 in FIG. 4.

An API 1701 is an API for acquiring a URL for accessing the recording medium 110 of the digital camera 100. If this API is executed using the GET 401, the URL of the recording medium 110 as illustrated in the API table 1700 can be acquired. In the present embodiment, a description is given using an SD card as an example of the recording medium 110. Further, if a plurality of media can be attached to the digital camera 100, a plurality of URLs can be acquired.

An API 1702 is an API for acquiring the URL of a directory recorded in the recording medium 110. If the API is executed using the GET 401, a list of URLs including directory names as illustrated in the API table 1700 can be acquired. In the present embodiment, a directory compliant with the DCF standard can be acquired. The DCF standard is a known standard, and therefore is not described herein. As another example, the directory that can be acquired using the API may not be compliant with DCF.

An API 1703 is an API for acquiring the URL of a content file recorded in the directory. If the API is executed using the GET 401, a list of the URLs of recording medium 110 as illustrated in the API table 1700 can be acquired. The API enables a content file to be acquired by specifying a file format of the content file. A specifying method is addition of a URL query parameter to a URL. The URL query parameter is a known technique, and therefore is not described herein. As described in the API table 1700, for example, to acquire a list of URLs by narrowing down to Joint Photographic Experts Group (JPEG) images only, the smart device 200 requests the API 1703 at the following URL.

http://192.168.1.1:8080/api/ver1/contents/sd/100CANON?type=jpeg

In the URL, "?type=jpeg" is a query parameter. If no query parameter is specified, the digital camera 100 transmits, as a response, a list of the URLs of all the content files present in a target directory. In the URL query parameter, although not illustrated, a list of the URLs of content files can also be specified in ascending order or descending order of image numbers, or in reverse chronological order or chronological order of the date and time of creation. In addition, in the URL query parameter, a plurality of items can be simultaneously specified.

If the API is executed using the DELETE 404, a directory at the specified URL and content files recorded in the directory are deleted. If the content files can be deleted, all the content files are deleted. If protection is set to a content file and the content file cannot be deleted, the directory and only the content file for which protection is set are left. While the API operates as described above in the present embodiment, a process of deleting no content files if a protected content file is present is also possible.

An API 1704 is an API for acquiring, operating, or deleting a content file. If this API is executed using the GET 401, a content file can be acquired. This API enables the content file to be acquired by specifying the type of data of the content file. A specifying method is addition of a URL query parameter to a URL. The URL query parameter is a known technique, and therefore is not described herein. As described in the API table 1700, for example, to acquire only a thumbnail image of the content file, the smart device 200 requests the API 1704 at the following URL.

http://192.168.1.1:8080/api/ver1/contents/sd/100CANON/IMG_0001.JPG?kind=thumb nail In the URL, "?kind=thumbnail" is a query parameter. If no query parameter is specified, the digital camera 100 transmits the main body of the image file. Examples of the type of data that can be specified by the URL query parameter include an embedded image and meta-information about an image file.

The API can operate a content file. The operation of the content file refers to setting of protection, rotation of an image, or assignment of rating information. If the content and the value of the operation are described in a request body and the API is executed using the PUT 403, the digital camera 100 operates a content file specified by a URL based on the indicated content.

If the API is executed using the DELETE 404, a content file at a specified URL is deleted. However, the content file is not deleted if protection is set to the content file and the content file cannot be deleted.

Figure 18:
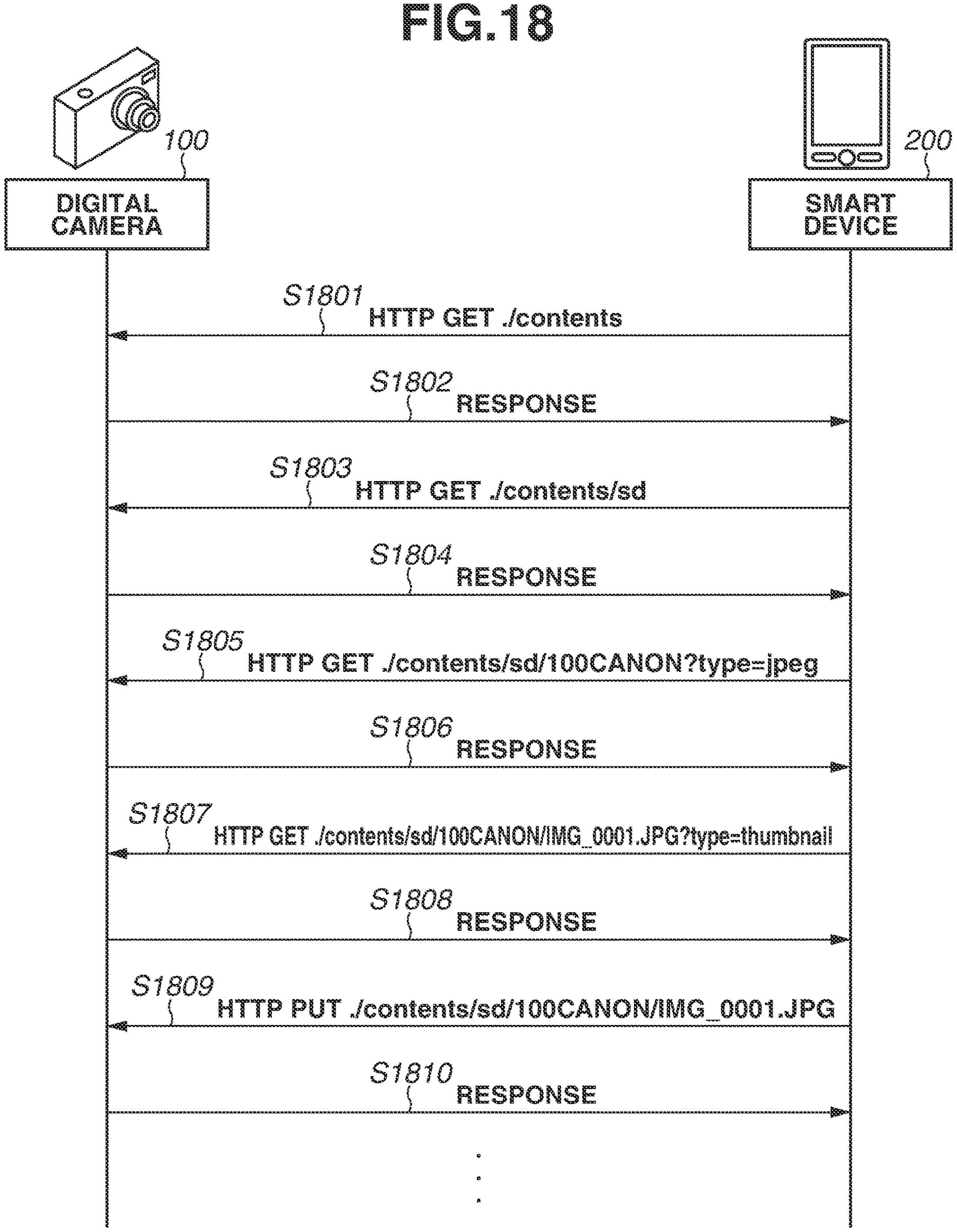
FIG. 18 is a sequence diagram in a case where the API for acquiring the content file of the digital camera according to the embodiment is executed.

FIG. 18 is a sequence illustrating the flow of processing when the communication APIs illustrated in FIG. 17 are executed.

Steps S1801 and S1802 are a sequence when the API 1701 is executed. Steps S1803 and S1804 are a sequence when the API 1702 is executed. Steps S1805 and S1806 are a sequence when the API 1703 is executed. Steps S1807, S1808, S1809, and S1810 are a sequence when the API 1704 is executed.

In step S1801, the control unit 201 of the smart device 200 requests the API 1701 from the digital camera 100 using the GET 401 via the communication unit 211.

In step S1802, if the control unit 101 of the digital camera 100 detects receipt of the request via the communication unit 111, the control unit 101 acquires the URL of an attached medium recorded in the work memory 104 and formats the URL into a response data set. Then, the control unit 101 describes the formatted data set in a response body and transmits the response body to the smart device 200 via the communication unit 111.

In step S1803, the control unit 201 of the smart device 200 requests the API 1702 from the digital camera 100 using the GET 401 via the communication unit 211.

In step S1804, if the control unit 101 of the digital camera 100 detects receipt of the request via the communication unit 111, the control unit 101 acquires a list of the URLs of directories from the work memory 104 and formats the list of the URLs into a response data set. Then, the control unit 101 describes the formatted data set in a response body and transmits the response body to the smart device 200 via the communication unit 111.

In step S1805, the control unit 201 of the smart device 200 requests the API 1703 from the digital camera 100 using the GET 401 via the communication unit 211. At this time, a URL query parameter is added so that only a JPEG file is picked up.

In step S1806, if the control unit 101 of the digital camera 100 detects receipt of the request via the communication unit 111, the control unit 101 acquires a list of the URLs of only JPEG files recorded in the work memory 104 and formats the list of the URLs into a response data set. Then, the control unit 101 describes the formatted data set in a response body and transmits the response body to the smart device 200 via the communication unit 111.

In step S1807, the control unit 201 of the smart device 200 requests the API 1704 from the digital camera 100 using the GET 401 via the communication unit 211. At this time, a URL query parameter is added so that a thumbnail image is acquired.

In step S1808, if the control unit 101 of the digital camera 100 detects receipt of the request via the communication unit 111, the control unit 101 acquires a thumbnail file from an image file recorded in the recording medium 110 and formats the thumbnail file into a response data set. Then, the control unit 101 describes the formatted data set in a response body and transmits the response body to the smart device 200 via the communication unit 111.

In step S1809, the control unit 201 of the smart device 200 acquires details of an instruction to operate a content file recorded in the work memory 204 through program processing. Then, the control unit 201 formats the details of the instruction to operate the content file into a data set based on request JSON syntax, describes the data set in a request body, and requests the API 1301 from the digital camera 100 using the POST 402 via the communication unit 211. In the present embodiment, as described in the API table 1700, an instruction to perform a protection process on the content file is given. If the control unit 101 of the digital camera 100 detects receipt of the request via the communication unit 111, the control unit 101 analyzes the JSON syntax described in the request body. Then, based on the requested instruction, the control unit 101 assigns a protection attribute to the content file in the recording medium 110.

In step S1810, if the above processing is completed, the control unit 101 formats the values for a response into a data set based on JSON syntax, describes the data set in a response body, and transmits the response body to the smart device 200 via the communication unit 111.

The APIs for acquiring a content file of the digital camera 100 have been described as above.

<Operation of Smart Device According to Present Embodiment>

As described above, the communication APIs according to the present embodiment have various characteristics. One of the characteristics is that JSON syntax to be described in a response body and JSON syntax to be described in a request body are in the same format. With this specification, since the JSON syntax is the same, the programmer who creates the control program of the smart device 200 for controlling the digital camera 100 does not have to write a processing program differently for each of the HTTP methods. The programmer duplicates the JSON syntax described in a response body transmitted from the digital camera 100 and changes only a necessary portion of the duplicated JSON syntax. Then, the programmer can utilize the resulting JSON syntax as it is as JSON syntax to be described in a request body when the PUT method is executed.

Another of the characteristics is that JSON syntax to be described in the response body of each API belonging to a particular API category is in the same format. With this specification, it is not necessary to separate processing for each type of imaging parameter or each HTTP method. Thus, the programmer who creates the control program of the smart device 200 for controlling the digital camera 100 can process all the imaging parameters in the API category 412 using the same function. In other words, the programmer does not have to write processing differently for each type of imaging parameter. This provides the advantage in that the amount of programming is reduced.

Figure 19:
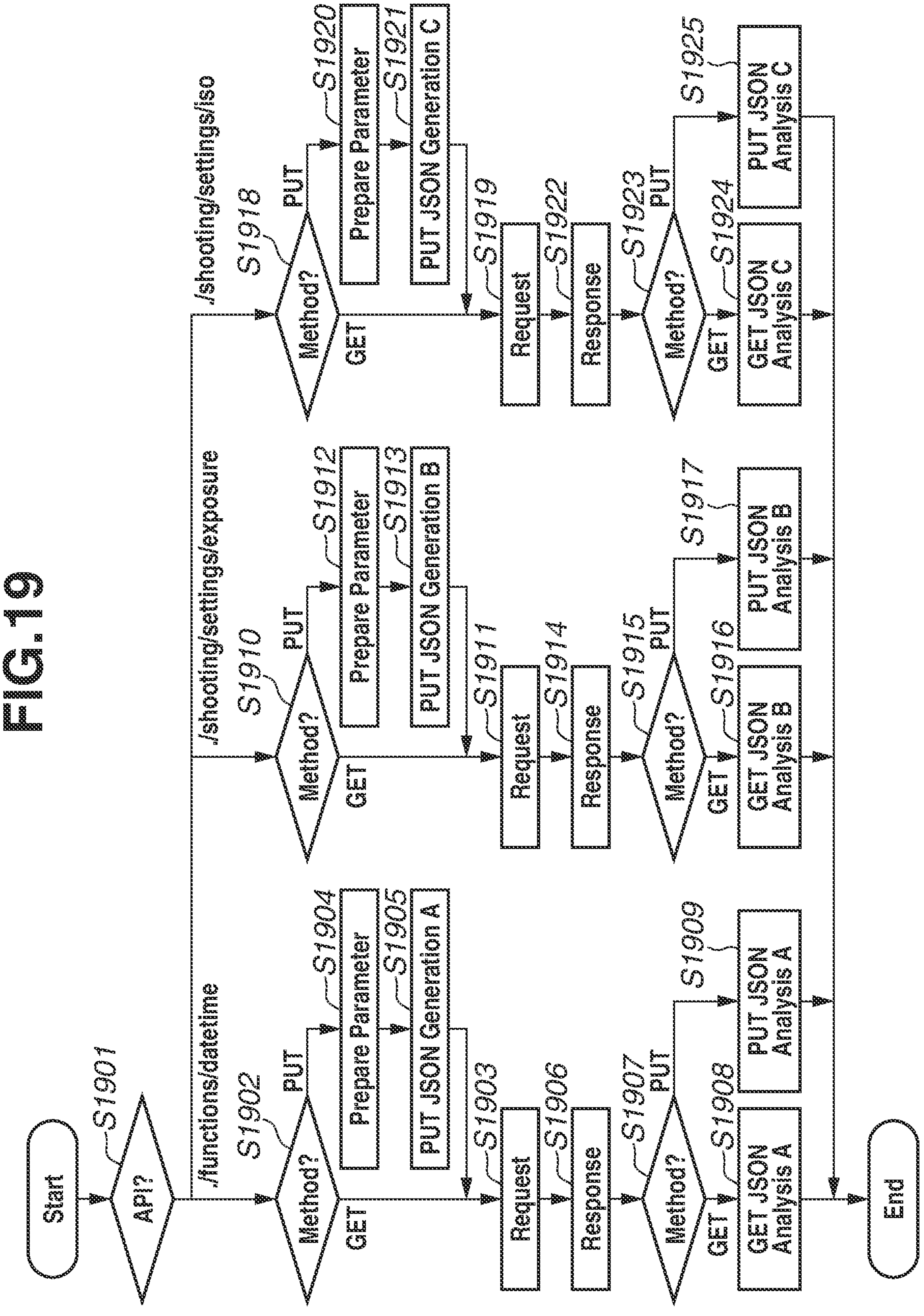
FIG. 19 is a flowchart of a program for, using conventional communication APIs, controlling the digital camera that operates by the smart device according to the embodiment.
Figure 20:
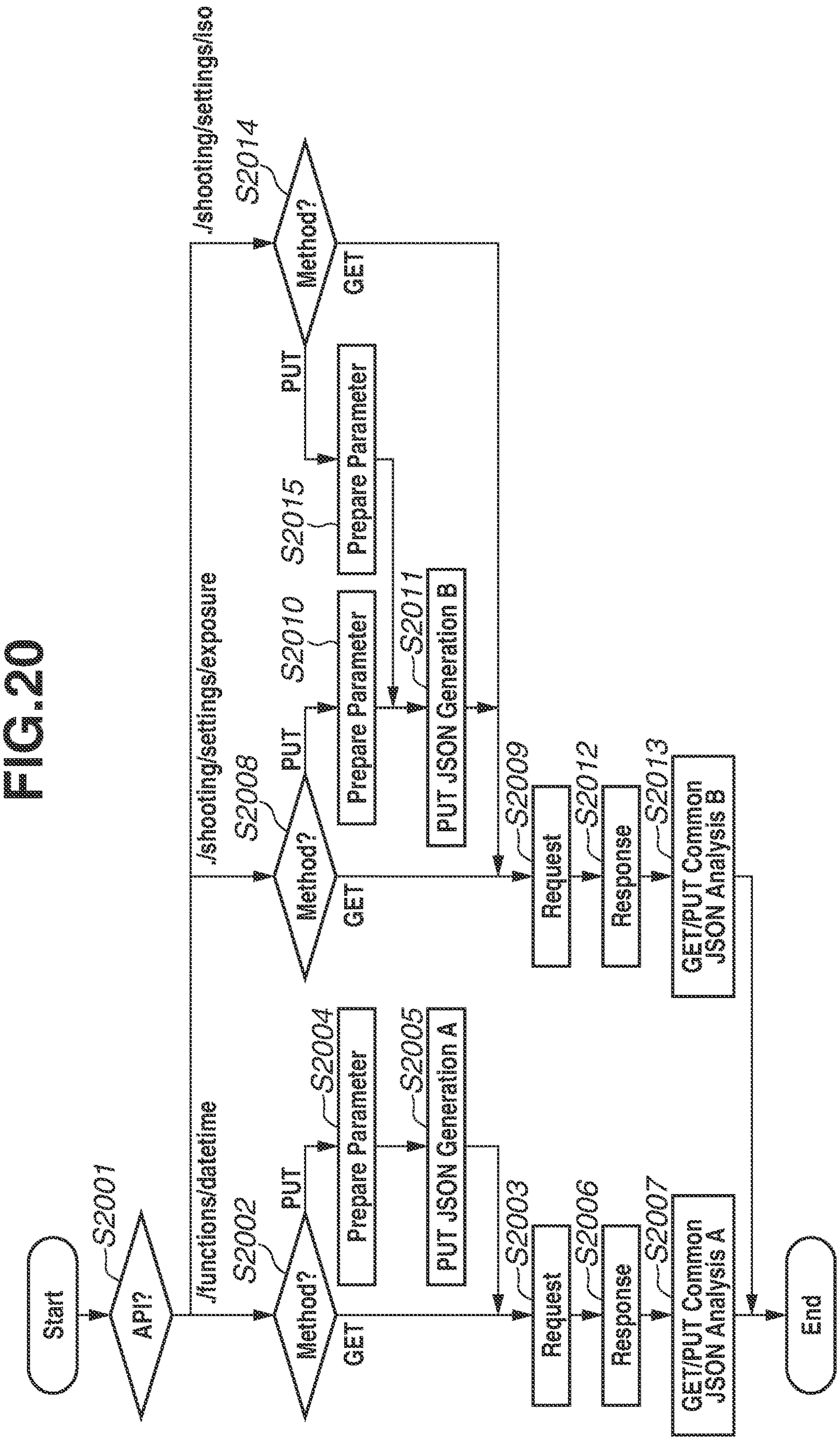
FIG. 20 is a flowchart of a program for, using the communication APIs according to the embodiment, controlling the digital camera that operates by the smart device according to the embodiment.

With reference to FIGS. 19 and 20, the above-described characteristics are specifically described in view of the control program of the smart device 200 for controlling the digital camera 100.

First, a description is given of a conventional case where the format of JSON syntax is not considered at all. The description is given by exemplifying a case where JSON syntax to be described in a response body and JSON syntax to be described in a request body are in different formats, and further, JSON syntax to be described in response bodies of APIs belonging to an API category is in different formats.

FIG. 19 is a flowchart of the control program of the smart device 200 for controlling the digital camera 100 in the above-described case.

The processing of this flowchart is started when an API is requested by an application in the state where the digital camera 100 and the smart device 200 are connected together.

In step S1901, the control unit 201 of the smart device 200 determines which API is requested by the application. If an API for acquiring or changing date and time information is requested, the processing proceeds to step S1902. If an API for acquiring or changing an exposure compensation value is requested, the processing proceeds to step S1910. If an API for acquiring or changing an ISO sensitivity value is requested, the processing proceeds to step S1918. The date and time information, the exposure compensation value, and the ISO sensitivity value are examples for descriptive purposes, and another API can be requested.

First, the case is described where the API for acquiring or changing the date and time information is requested.

In step S1902, the control unit 201 of the smart device 200 determines which HTTP method is requested. To acquire the date and time information, the GET method is requested. To change the date and time information, the PUT method is requested. Thus, in this step, the control unit 201 determines whether the GET method or the PUT method is requested. If the GET method is requested, the processing proceeds to step S1903.

In step S1903, to acquire the date and time information, the control unit 201 accesses a predetermined URL using the GET method, thereby requesting the API for acquiring the date and time information.

If the PUT method is requested, the processing proceeds to step S1904.

In step S1904, to describe the date and time to be changed in JSON based on an instruction, the control unit 201 generates a parameter for JSON.

In step S1905, the control unit 201 generates PUT JSON in which the parameter generated in step S1904 is described.

Then, as with the GET method, in step S1903, to change the date and time information, the control unit 201 accesses a predetermined URL using the PUT method, thereby requesting the API for changing the date and time information.

As a result of the request in step S1903, the digital camera 100 describes the currently counted date and time information in the format of JSON syntax corresponding to the requested API and returns the currently counted date and time information as a response.

In step S1906, the control unit 201 receives the response.

Next, in step S1907, the control unit 201 determines whether the response has been made to a request for the GET method or the PUT method.

If the response has been made to the GET method, then in step S1908, the control unit 201 executes a JSON analysis process that is in the format of the JSON syntax to be returned as the response to the GET method, and extracts the date and time information from the response. Consequently, the smart device 200 acquires the date and time information from the digital camera 100.

If the response has been made to the PUT method, then in step S1909, the control unit 201 executes a JSON analysis process that is in the format of the JSON syntax to be returned as the response to the PUT method, and extracts the changed date and time information from the response. Consequently, the smart device 200 acquires the result of the change in the date and time information from the digital camera 100.

The case where the API for acquiring or changing the date and time information is requested has been described as above.

Next, the case is described where the API for acquiring or changing the exposure compensation value is requested.

In step S1910, the control unit 201 determines which HTTP method is requested. To acquire the exposure compensation value, the GET method is requested. To change the exposure compensation value, the PUT method is requested. Thus, in this step, the control unit 201 determines whether the GET method or the PUT method is requested. If the GET method is requested, the processing proceeds to step S1911.

In step S1911, to acquire the exposure compensation value, the control unit 201 accesses a predetermined URL using the GET method, thereby requesting the API for acquiring the exposure compensation value.

If the PUT method is requested, the processing proceeds to step S1912.

In step S1912, to describe the exposure compensation value to be changed in JSON based on an instruction, the control unit 201 generates a parameter for JSON.

In step S1913, the control unit 201 generates PUT JSON in which the parameter generated in step S1912 is described.

Then, as with the GET method, in step S1911, to change the exposure compensation value, the control unit 201 accesses a predetermined URL using the PUT method, thereby requesting the API for changing the exposure compensation value.

As a result of the request in step S1911, the digital camera 100 describes the current exposure compensation value in the format of JSON syntax corresponding to the requested API and returns the current exposure compensation value as a response.

In step S1914, the control unit 201 receives the response.

Next, in step S1915, the control unit 201 determines whether the response has been made to a request for the GET method or the PUT method.

If the response has been made to the GET method, then in step S1916, the control unit 201 executes a JSON analysis process that is in the format of the JSON syntax to be returned as the response to the GET method, and extracts the exposure compensation value from the response. Consequently, the smart device 200 acquires the exposure compensation value from the digital camera 100.

If the response has been made to the PUT method, then in step S1917, the control unit 201 executes a JSON analysis process that is in the format of the JSON syntax to be returned as the response to the PUT method, and extracts the changed exposure compensation value from the response. Consequently, the smart device 200 acquires the result of the change in the exposure compensation value from the digital camera 100.

The case where the API for acquiring or changing the exposure compensation value is requested has been described as above.

Next, the case is described where the API for acquiring or changing the ISO sensitivity value is requested.

In step S1918, the control unit 201 determines which HTTP method is requested. To acquire the ISO sensitivity value, the GET method is requested. To change the ISO sensitivity value, the PUT method is requested. Thus, in this step, the control unit 201 determines whether the GET method or the PUT method is requested. If the GET method is requested, the processing proceeds to step S1919.

In step S1919, to acquire the ISO sensitivity value, the control unit 201 accesses a predetermined URL using the GET method, thereby requesting the API for acquiring the ISO sensitivity value.

If the PUT method is requested, the processing proceeds to step S1920.

In step S1920, to describe the ISO sensitivity value to be changed in JSON based on an instruction, the control unit 201 generates a parameter for JSON.

In step S1921, the control unit 201 generates PUT JSON in which the parameter generated in step S1920 is described.

Then, as with the GET method, in step S1919, to change the ISO sensitivity value, the control unit 201 accesses a predetermined URL using the PUT method, thereby requesting the API for changing the ISO sensitivity value.

As a result of the request in step S1919, the digital camera 100 describes the current ISO sensitivity value in the format of JSON syntax corresponding to the requested API and returns the current ISO sensitivity value as a response.

In step S1922, the control unit 201 receives the response.

Next, in step S1923, the control unit 201 determines whether the response has been made to a request for the GET method or the PUT method.

If the response has been made to the GET method, then in step S1924, the control unit 201 executes a JSON analysis process that is in the format of the JSON syntax to be returned as the response to the GET method, and extracts the ISO sensitivity value from the response. Consequently, the smart device 200 acquires the ISO sensitivity value from the digital camera 100.

If the response has been made to the PUT method, then in step S1925, the control unit 201 executes a JSON analysis process that is in the format of the JSON syntax to be returned as the response to the PUT method, and extracts the changed ISO sensitivity value from the response. Consequently, the smart device 200 acquires the result of the change in the ISO sensitivity value from the digital camera 100.

The case where the API for acquiring or changing the ISO sensitivity value is requested has been described as above.

As described above, if the format of JSON syntax to be used in a request by the PUT method is different for each API, then as illustrated in steps S1905, S1913, and S1921, it is necessary to prepare a different JSON generation program for each API. Further, if the format of JSON syntax is different for each request method for requesting an API, then as illustrated in steps S1908, S1909, S1916, S1917, S1924, and S1925, it is necessary to prepare a different JSON analysis program for each request method.

Next, a description is given of a case where the APIs discussed in the present embodiment are used. The description is given by exemplifying a case where JSON syntax to be described in the response body and JSON syntax to be described in the request body are in the same format, and further, JSON syntax to be described in response bodies of APIs belonging to a particular API category is in the same format.

FIG. 20 is a flowchart of the control program of the smart device 200 for controlling the digital camera 100 in the case where the APIs discussed in the present embodiment are used.

The processing of this flowchart is started when an API is requested by an application in the state where the digital camera 100 and the smart device 200 are connected together.

In step S2001, a process similar to that of step S1901 in FIG. 19 is executed, and the type of the API requested by the application is determined.

First, a case is described where the API 701 for acquiring or changing the date and time information is requested in step S2001. In this case, the processing proceeds to step S2002.

In steps S2002 to S2006, processes similar to those of steps S1902 to S1906 in FIG. 19 are executed.

Next, in step S2007, the control unit 201 analyzes the JSON syntax returned as the response through a JSON analysis process that can be used in common by both the GET method and the PUT method, and extracts the current date and time information or the result of the change in the date and time information. As described above, if the formats of the JSON syntax are the same, the analysis processes can be combined into a single analysis process even if the methods are different. This reduces the load of implementing a program.

Next, a case is described where the API 1101 for acquiring or changing the exposure compensation value is requested in step S2001. In this case, the processing proceeds to step S2008.

In steps S2008 to S2012, processes similar to those of steps S1910 to S1914 in FIG. 19 are executed.

Next, in step S2013, the control unit 201 analyzes the JSON syntax returned as the response through a JSON analysis process that can be used in common by both the GET method and the PUT method, and extracts the current exposure compensation value or the result of the change in the exposure compensation value. As described above, if the formats of the JSON syntax are the same, the analysis processes can be combined into a single analysis process even if the methods are different. This reduces the load of implementing a program. With reference to FIG. 11, a response body of an API regarding the exposure compensation value has "value" and "ability" in the case of the GET method and has only "value" in the case of the PUT method. Although the formats of JSON syntax are different, the field "value" is common. Thus, an analysis process can be designed so that a common analysis process is executed in which the field "value" is referenced in both of the cases of the GET and PUT methods, and the field "ability" is referenced only in the case of the PUT method. This can make an amount of programming smaller than in a case where an analysis process is designed for a case where all the fields are different.

Next, a case is described where the API 1102 for acquiring or changing the ISO sensitivity value is requested in step S2001. In this case, the processing proceeds to step S2014.

In step S2014, similarly to step S1918 in FIG. 19, the control unit 201 determines which HTTP method is requested.

If the GET method is requested, the processing proceeds to step S2009. In step S2009, a process similar to the case where the API for acquiring or changing the exposure compensation value is requested is executed. This can be achieved because the formats of JSON syntax of responses made to the GET method for acquiring the ISO sensitivity value and the GET method for acquiring the exposure compensation value are the same. In other words, since the formats of syntax are the same, the analysis of the syntax can also be made common. This can reduce the load of implementation.

If the PUT method is requested, the processing proceeds to step S2015.

In step S2015, to describe the ISO sensitivity value to be changed in JSON based on an instruction, the control unit 201 generates a parameter for JSON. Then, in step S2011, through a JSON generation process similar to that of the PUT method for changing the exposure compensation value, the control unit 201 describes the parameter generated in step S2015. This can be achieved because the formats of JSON syntax of responses made to the PUT method for changing the exposure compensation value and the PUT method for changing the ISO sensitivity value are the same. In other words, since the formats of syntax are the same, the generation of the syntax can also be made common. This can reduce the load of implementation. Then, the processing proceeds to step S2009. In step S2009, a process similar to the case where the exposure compensation value is changed is executed.

As described above, in a case where the communication APIs according to the present embodiment are used, it is not necessary to prepare a processing program for JSON syntax for each HTTP method. In addition, all the APIs of which response bodies have the same JSON syntax can be processed using the same program. In other words, as can be understood from the flowchart in FIG. 20, an amount of programming for the processing decreases. Thus, an implementer can easily understand how to use the processing program, and can suitably create a program.

In the present embodiment, the descriptions have been given using the API category 412 as an example. However, a similar effect can be obtained in the other API categories as long as the JSON syntax of a request body and that of a response body are the same. It may be difficult to make a structure of the JSON syntax the same for all the APIs depending on the category. However, at least APIs using the same structure of the JSON syntax can be collectively processed. Thus, the effect of reducing the load of implementation is similarly obtained.

<Operation of Camera>

Next, a description is given of an operation of the camera corresponding to FIG. 20.

Figure 21:
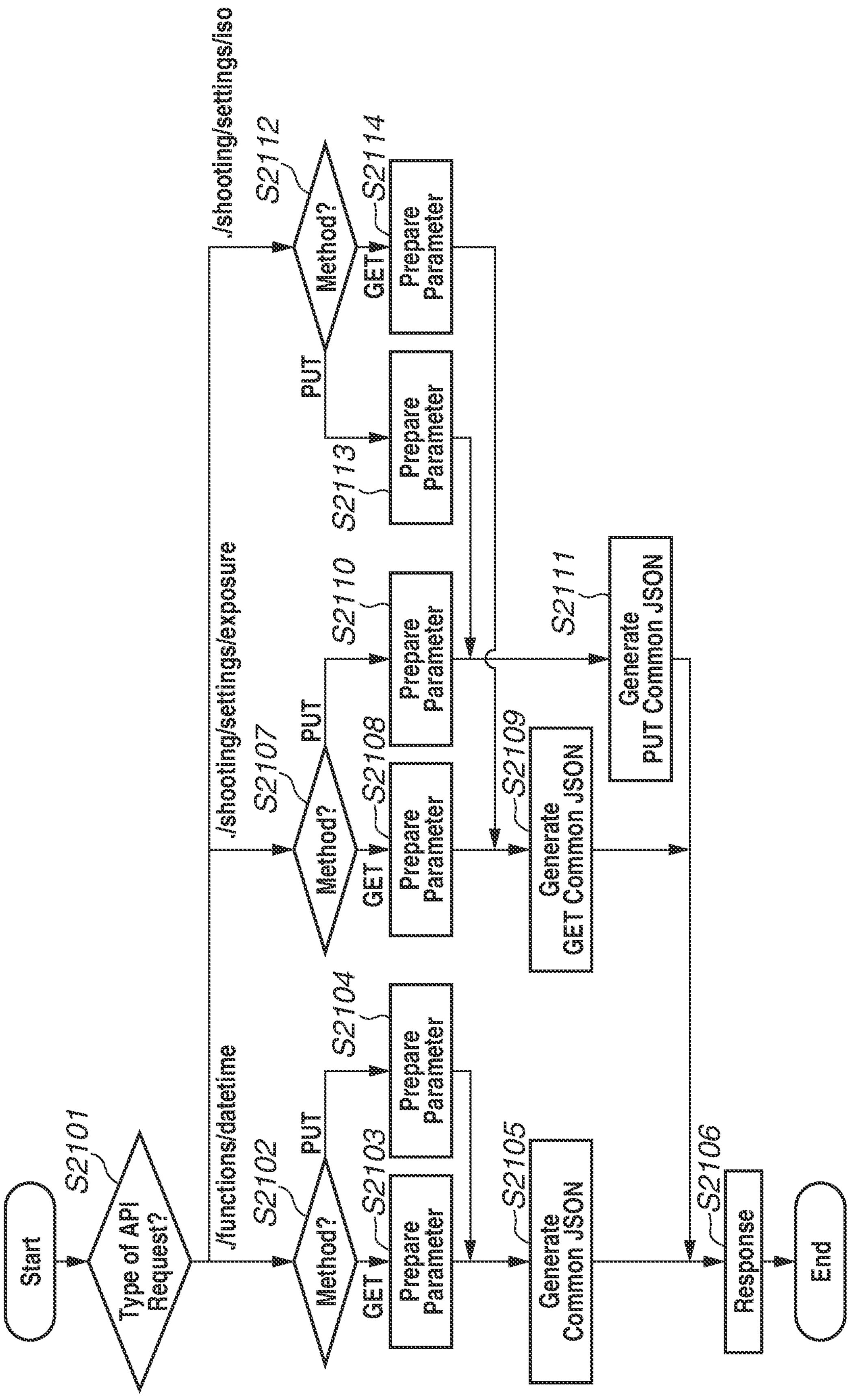
FIG. 21 is a flowchart illustrating an operation of the digital camera according to the embodiment.

FIG. 21 is a flowchart illustrating the operation of the digital camera 100. This flowchart is started when the digital camera 100 receives a request from the smart device 200 using a communication API in the state where the smart device 200 is connected to the digital camera 100.

In step S2101, the control unit 101 determines the type of the request using the communication API received from the smart device 200. If the control unit 101 receives a request to acquire or change the date and time information, the processing proceeds to step S2102. If the control unit 101 receives a request to acquire or change the exposure compensation value, the processing proceeds to step S2107. If the control unit 101 receives a request to acquire or change the ISO sensitivity value, the processing proceeds to step S2112.

In step S2102, the control unit 101 determines a requested method. In the case of the GET method, the processing proceeds to step S2103. In the case of the PUT method, the processing proceeds to step S2104.

In step S2103, the control unit 101 reads the current date and time information and generates a parameter for describing the date and time information in JSON.

In step S2104, the control unit 101 changes the date and time information to the specified date and time information and generates a parameter for describing the result of the change in JSON.

In step S2105, by a common JSON generation process, the control unit 101 describes the parameter generated in step S2103 or S2104 in the common format of JSON syntax.

In step S2106, the control unit 101 returns, to the smart device 200, a response to the request together with the JSON generated in step S2105.

In step S2107, the control unit 101 determines the method. In the case of the GET method, the processing proceeds to step S2108. In the case of the PUT method, the processing proceeds to step S2110.

In step S2108, the control unit 101 reads the current exposure compensation value and generates a parameter for describing the exposure compensation value in JSON.

Next, in step S2109, the control unit 101 describes the parameter generated in step S2108 in the format of JSON syntax common to the GET method through a JSON generation process common to the GET method. Then, in step S2106, the control unit 101 returns, to the smart device 200, a response to the request together with the JSON generated in step S2109.

In step S2110, the control unit 101 changes the exposure compensation value to the specified exposure compensation value and generates a parameter for describing the result of the change in JSON.

Next, in step S2111, the control unit 101 describes the parameter generated in step S2110 in the format of JSON syntax common to the PUT method through a JSON generation process common to the PUT method. Then, in step S2106, the control unit 101 returns, to the smart device 200, a response to the request together with the JSON generated in step S2111.

In step S2112, the control unit 101 determines the method. In the case of the GET method, the processing proceeds to step S2114. In the case of the PUT method, the processing proceeds to step S2113.

In step S2113, the control unit 101 changes the ISO sensitivity value to the specified ISO sensitivity value and generates a parameter for describing the result of the change in JSON. Then, in step S2111, the control unit 101 describes the parameter in the format of JSON syntax similar to that of the exposure compensation value. In step S2106, the control unit 101 transmits a response to the smart device 200.

In step S2114, the control unit 101 reads the current ISO sensitivity value and generates a parameter for describing the ISO sensitivity value in JSON. Then, in step S2109, the control unit 101 describes the parameter in the format of JSON syntax similar to that of the exposure compensation value. In step S2106, the control unit 101 transmits a response to the smart device 200.

The operation of the digital camera 100 corresponding to FIG. 20 has been described as above.

As described above, the GET method and the PUT method return responses having the common format of JSON syntax, whereby it is possible to reduce the load of implementing an application using the communication APIs. Further, the formats of JSON syntax of responses to the respective methods are made common among APIs in a particular API category, whereby it is possible to similarly reduce the load of implementing an application using the communication APIs.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments. It will of course be understood that this invention has been described above by way of example only, and that modifications of detail can be made within the scope of this invention.

This application claims the benefit of Japanese Patent Application No. 2018-229968, filed Dec. 7, 2018, which is hereby incorporated by reference herein in its entirety.

What is claimed is:

1. A communication apparatus comprising:

a communication unit configured to communicate with an external apparatus based on Hypertext Transfer Protocol (HTTP);

a recording medium configured to record programs corresponding to a plurality of application programming interfaces (APIs); and a control unit configured to control the communication unit to, in a case where a request regarding any of the plurality of APIs is received via the communication unit, execute a program regarding which, among the programs corresponding to the plurality of APIs, the request is received, and return a response including a response body described in a predetermined data description language syntax structure to the request, wherein a response body of a response to a request using a first HTTP request method regarding a predetermined API represented by a predetermined Uniform Resource Locator (URL) among the plurality of APIs and a response body of a response to a request using a second HTTP request method regarding the same predetermined API represented by the predetermined URL are described in the same format of the predetermined data description language syntax structure such that fields, including any subfields, that are included in each of the response bodies are identical, wherein the request using the first HTTP request method is a request to acquire data, wherein the request using the second HTTP request method is a request to change data, and wherein the communication unit and the control unit are implemented by one or more processors, and the recording medium is implemented by one or more memories.

2. The communication apparatus according to claim 1, wherein the first HTTP request method does not have a request body, and wherein the second HTTP request method has a request body.

3. The communication apparatus according to claim 1, wherein in the second HTTP request method, a syntax structure of a request body of a request and a syntax structure of a response body of a response are the same.

4. The communication apparatus according to claim 1, further comprising an image capturing unit, wherein the plurality of APIs includes an API for remotely controlling the image capturing unit.

5. The communication apparatus according to claim 4, wherein the plurality of APIs is represented by a Uniform Resource Locator (URL) having a hierarchical syntax structure with respect to each category of remote control.

6. The communication apparatus according to claim 5, wherein the control unit is configured to perform control not to receive a request for an API corresponding to a URL represented by a lower hierarchical level among the plurality of APIs without receiving a request for an API corresponding to a URL represented by an upper hierarchical level.

7. The communication apparatus according to claim 1, wherein the syntax structure of the response body is a JavaScript Object Notation (JSON) syntax structure.

8. A method for controlling a communication apparatus including a communication unit, a recording medium in which programs corresponding to a plurality of application programming interfaces (APIs) are recorded, and a control unit, the control method comprising:

communicating with an external apparatus based on Hypertext Transfer Protocol (HTTP) via the communication unit; and controlling the communication unit to, in a case where a request regarding any of the plurality of APIs is received via the communication unit, execute a program regarding which, among the programs corresponding to the plurality of APIs, the request is received, and return a response including a response body described in a predetermined data description language syntax structure to the request, wherein a response body of a response to a request using a first HTTP request method regarding a predetermined API represented by a predetermined Uniform Resource Locator (URL) among the plurality of APIs and a response body of a response to a request using a second HTTP request method regarding the same predetermined API represented by the predetermined URL are described in the same format of the predetermined data description language syntax structure such that fields, including any subfields, that are included in each of the response bodies are identical, wherein the request using the first HTTP request method is a request to acquire data, wherein the request using the second HTTP request method is a request to change data, and wherein the communication unit and the control unit are implemented by one or more processors, and the recording medium is implemented by one or more memories.

9. The method for controlling the communication apparatus according to claim 8, wherein the request using the first HTTP request method is a request to acquire data, wherein the request using the second HTTP request method is a request to change data, wherein the first HTTP request method does not have a request body, and wherein the second HTTP request method has a request body.

10. The method for controlling the communication apparatus according to claim 8, wherein the request using the second HTTP request method is a request to change data, and wherein in the second HTTP request method, a syntax structure of a request body of a request and a syntax structure of a response body of a response are the same.

11. The method for controlling the communication apparatus according to claim 8, wherein the communication apparatus further includes an image capturing unit, and wherein the plurality of APIs includes an API for remotely controlling the image capturing unit.

12. The method for controlling the communication apparatus according to claim 11, wherein the plurality of APIs is represented by a URL having a hierarchical syntax structure with respect to each category of remote control.

13. The method for controlling the communication apparatus according to claim 12, wherein control is performed not to receive a request for an API corresponding to a URL represented by a lower hierarchical level among the plurality of APIs without receiving a request for an API corresponding to a URL represented by an upper hierarchical level.

14. The method for controlling the communication apparatus according to claim 8, wherein the syntax structure of the response body is a JavaScript Object Notation (JSON) syntax structure.

15. A non-transitory recording medium in which is stored a program comprising instructions which, when the program is executed by a computer, cause the computer to carry out the method of claim 8.

16. A non-transitory computer-readable medium storing instructions that, when executed by an information processing apparatus, cause the information processing apparatus to perform operations comprising:

communicating with an external apparatus based on Hypertext Transfer Protocol (HTTP) via a communication unit;

recording programs corresponding to a plurality of application programming interfaces (APIs); and controlling the communication unit to, in a case where a request regarding any of the plurality of APIs is received via the communication unit, execute a program regarding which, among the programs corresponding to the plurality of APIs, the request is received, and return a response including a response body described in a predetermined data description language syntax structure to the request, wherein a response body of a response to a request using a first HTTP request method regarding a predetermined API represented by a predetermined Uniform Resource Locator (URL) among the plurality of APIs and a response body of a response to a request using a second HTTP request method regarding the same predetermined API represented by the predetermined URL are described in the same format of the predetermined data description language syntax structure such that fields, including any subfields, that are included in each of the response bodies are identical, wherein the request using the first HTTP request method is a request to acquire data, and wherein the request using the second HTTP request method is a request to change data.

* * * * *